(12) United States Patent
Yang

(10) Patent No.: US 8,067,901 B2
(45) Date of Patent: *Nov. 29, 2011

(54) BI-DIRECTIONAL LIGHT EMITTING DIODE DRIVE CIRCUIT IN PULSED POWER PARALLEL RESONANCE

(76) Inventor: Tai-Her Yang, Dzan-Hwa (TW)

( * ) Notice: Subject to any disclaimer, the term of this patent is extended or adjusted under 35 U.S.C. 154(b) by 312 days.

This patent is subject to a terminal disclaimer.

(21) Appl. No.: 12/351,934

(22) Filed: Jan. 12, 2009

(65) Prior Publication Data

US 2009/0179590 A1 Jul. 16, 2009

Related U.S. Application Data

(60) Provisional application No. 61/020,811, filed on Jan. 14, 2008.

(51) Int. Cl.
*H05B 37/02* (2006.01)
(52) U.S. Cl. .................. 315/297; 315/250; 315/307
(58) Field of Classification Search .................. 315/246, 315/248, 250, 258, 283, 290, 291, 297, 307, 315/227 R, 228, 239, 244, 276
See application file for complete search history.

(56) References Cited

U.S. PATENT DOCUMENTS

| 5,247,238 | A  | * | 9/1993 | Yang ............................. 320/142 |
|---|---|---|---|---|
| 6,628,085 | B2 | * | 9/2003 | Yang .......................... 315/169.3 |
| 7,164,237 | B2 | * | 1/2007 | Van Casteren ............ 315/209 R |
| 7,489,086 | B2 | * | 2/2009 | Miskin et al. ............. 315/185 R |
| 7,564,198 | B2 | * | 7/2009 | Yamamoto et al. .......... 315/307 |
| 7,868,561 | B2 | * | 1/2011 | Weightman et al. .......... 315/294 |
| 2006/0197466 | A1 | * | 9/2006 | Park .................................. 315/224 |
| 2008/0211421 | A1 | * | 9/2008 | Lee et al. ...................... 315/250 |
| 2008/0231204 | A1 | * | 9/2008 | Praiswater et al. ........... 315/192 |

* cited by examiner

*Primary Examiner* — Shawki S Ismail
*Assistant Examiner* — Crystal L Hammond
(74) *Attorney, Agent, or Firm* — Rabin & Berdo, P.C.

(57) ABSTRACT

The present invention is characterized by using capacitive, inductive or resistive impedance to constitute the first impedance which is series connected with the second impedance constituted by parallel connecting the capacitive and inductive impedances that appears parallel resonance with the pulsed period to receive pulsed power, thereby to form a divided bidirectional power at the two ends of the first and second impedances, so as toe drive the bidirectional conducting light emitting diode.

25 Claims, 9 Drawing Sheets

BI-DIRECTIONAL LIGHT EMITTING DIODE DRIVE CIRCUIT IN PULSED POWER PARALLEL RESONANCE

BACKGROUND OF THE INVENTION (a) Field of the Present Invention

The present invention discloses to use a pulsed power as the power source, whereof the first impedance which is constituted by the capacitive or inductive or resistive impedance components and the second capacitive impedance which is constituted by parallel connection of capacitive impedance components and inductive impedance components and appear parallel resonance with the pulse period of the pulsed power are series connected to receive the pulsed power, whereby it is characterized in that the voltage of the pulsed power source is divided by the first and second impedances in series connection, and the divided power is used to drive the bidirectional conducting light emitting diode set.

(b) Description of the Prior Art

In the conventional Light emitting diode drive circuit using AC or DC power source, light emitting diode current is usually limited by series connecting a current limit resistor as the impedance, whereby the voltage drop of the resistive impedance in series connection normally consumes a lot of electrical power and causes accumulated heat that are its imperfections.

SUMMARY OF THE PRESENT INVENTION

The present invention is comprised of that the capacitive or inductive or resistive impedance components constitute a first impedance, and the capacitive and inductive impedance components in parallel connection constitute a second impedance, whereof the first impedance is series connected with the second impedance, the two ends of the first impedance and second impedance in series connection are applied with a pulsed power input so as to form divided power at the two ends, whereof the inherent parallel resonance frequency of the second impedance is the same as the pulse period of the pulsed power so it appear in parallel resonance status at pulsed power input, whereby the divided power across the two ends of the second impedance drives the bi-directional conducting light emitting diode set to emit light.

DESCRIPTION OF MAIN COMPONENT SYMBOLS

C100, C200: Capacitor
CR100, CR101, CR102, CR201, CR202: Diode
ESD101, ESD102: Charge/discharge device
I100, I103, I104, I200: Inductive impedance component
IT200: Separating type transformer
L100: Bi-directional conducting light emitting diode set
LED101: First light emitting diode
LED102: Second light emitting diode
R101: Discharge resistance R100, R103, R104: Current limit resistor
ST200: Self-coupled transformer
U100: Bi-directional light emitting diode drive circuit
W0: Self-coupled voltage change winding
W1: Primary side winding
W2: Secondary side winding
Z101: First impedance
Z102: Second impedance
ZD101, ZD102: Zener diode
300: Bi-directional power modulator of series connection type
330: DC power modulator of series connection type
400: Bi-directional power modulator of parallel connection type
430: DC power modulator of parallel connection type
500: Impedance component
600: Switching device
5000: DC to DC Converter

DETAILED DESCRIPTION OF THE PREFERRED EMBODIMENTS

The bidirectional light emitting diode drive circuit in pulsed power parallel resonance of the present invention, in which the circuit function and operation of the bidirectional light emitting diode drive circuit (U100) is mainly comprised of at least one first impedance which is constituted by at least one capacitive or inductive or resistive impedance component; a second impedance which is constituted by at least one capacitive impedance and at least one inductive component in parallel connection, whereof its inherent parallel resonance frequency is the same as the pulse period of the pulsed power to appear parallel resonance status; and at least one bidirectional conducting light emitting diode set which is constituted by at least one first light emitting diode and at least one second light emitting diode in parallel connection of reverse polarities, whereof it is parallel connected with the two ends of the at least one second impedance while the two ends of at least one first impedance and at least one second impedance in series connection receive pulsed power input to form divided voltage across the two ends of the first impedance and second impedance respectively, whereof the divided power drives at least one bi-directional conducting light emitting diode set, thereby to constitute the bi-directional light emitting diode drive circuit in pulsed power parallel resonance.

Figure 1:
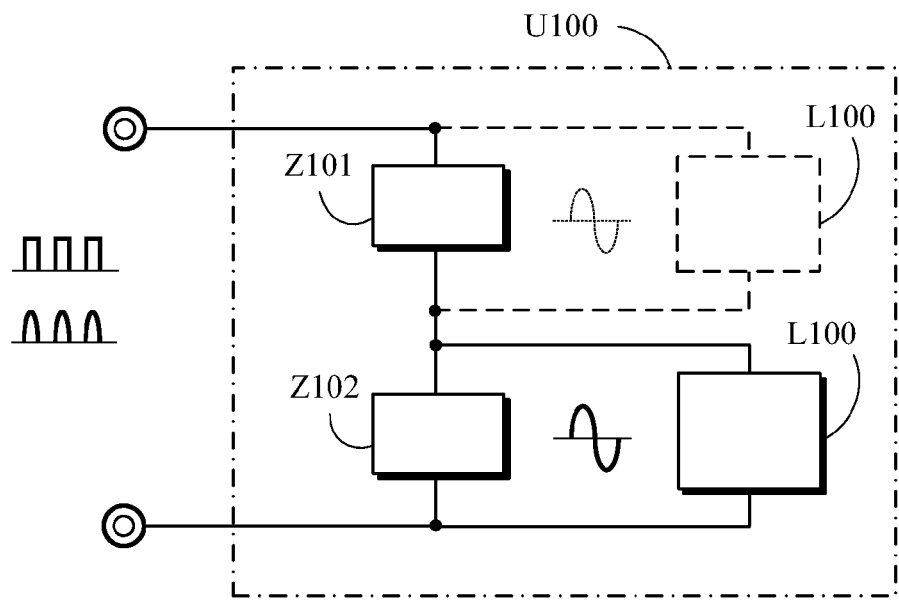
FIG. 1 is the schematic block diagram of the bidirectional light emitting diode drive circuit in pulsed power parallel resonance.

FIG. 1 is the schematic block diagram of the bi-directional light emitting diode drive circuit in pulsed power parallel resonance, in which the circuit function is operated through the bi-directional light emitting diode drive circuit (U100) as shown in FIG. 1, whereof it is comprised of that:

The first impedance (Z101), which includes:

(1) It is constituted by a capacitor (CI00) or an inductive impedance component or a resistive impedance component, or one kind or more than one kind and one or more than one impedance components, or two kinds or more than two kinds of impedance components, whereof the impedance components are respectively one or more than one in series connection, or parallel connection, or series and parallel connection to provide DC or AC impedances; or (2) At least one capacitive impedance component and at least one inductive impedance component are mutually series connected to have the same pulse period as pulsed power source to appear series resonance status, or the at least one capacitive impedance component and the at least one inductive impedance component can be mutually parallel connected to appear parallel resonance with the pulse period of the pulsed power source;

The second impedance (Z102) includes:

(1) It is constituted by at least one inductive impedance component (1200) and at least one capacitor (C200) in parallel connection to have the same pulse period as the pulsed power to appear corresponding impedance parallel resonance status and end voltage status;

At least one first impedance (Z101) and at least one second impedance (Z102) are mutually series connected, whereof the two ends of the series connected first impedance (Z101) and the second impedance (Z102) are for inputting:

(1) DC pulsed power; or
(2) The DC pulsed power with constant or variable voltage and constant or variable periods converted from DC power source; or
(3) The DC pulsed power with constant or variable voltage and constant or variable periods converted from DC power which is further rectified from AC power; or
(4) The half-wave or full-wave DC pulsed power rectified from constant or variable AC power with constant or variable voltage and constant or variable frequency;

A bi-directional conducting light emitting diode set (L100): it is constituted by at least one first light emitting diode (LED101) and at least one second light emitting diode (LED102) in parallel connection of inverse polarities, whereof the numbers of the first light emitting diode (LED101) and the numbers of the second light emitting diode (LED102) can be the same or different, further, the first light emitting diode (LED101) and the second light emitting diode (LED102) can be respectively constituted by one forward current polarity light emitting diode; or two or more than two forward current polarity light emitting diodes in series or parallel connections; or three or more than three forward current polarity light emitting diodes in series or parallel connections or in series and parallel connections; the bi-directional conducting light emitting diode set (L100) can be optionally installed with one or more than one sets as needed, whereof it is parallel connected across the two ends of both or either of the first impedance (Z101) or the second impedance (Z102) to form divided power at two ends of both the first impedance (Z101) and the second impedance (Z102) by the power input, thereby to drive the bi-directional conducting light emitting diode set (L100) to emit light.

The bi-directional light emitting diode drive circuit in pulsed power parallel resonance, in which the first impedance (Z101) and the second impedance (Z102) of the bi-directional light emitting diode drive circuit (U100) as well as the bi-directional conducting light emitting diode set (L100) can be selected to be one or more than ones as needed.

Figure 2:
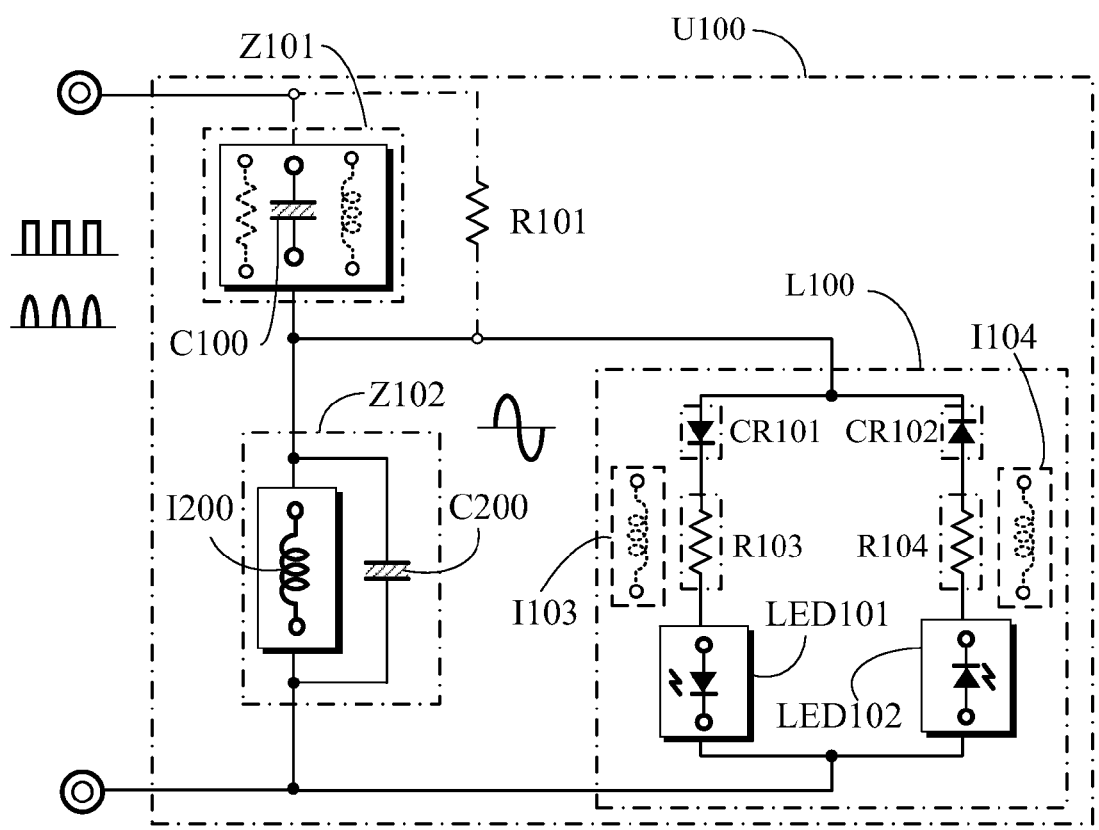
FIG. 2 is the circuit example schematic diagram of the present invention.
Figure 3:
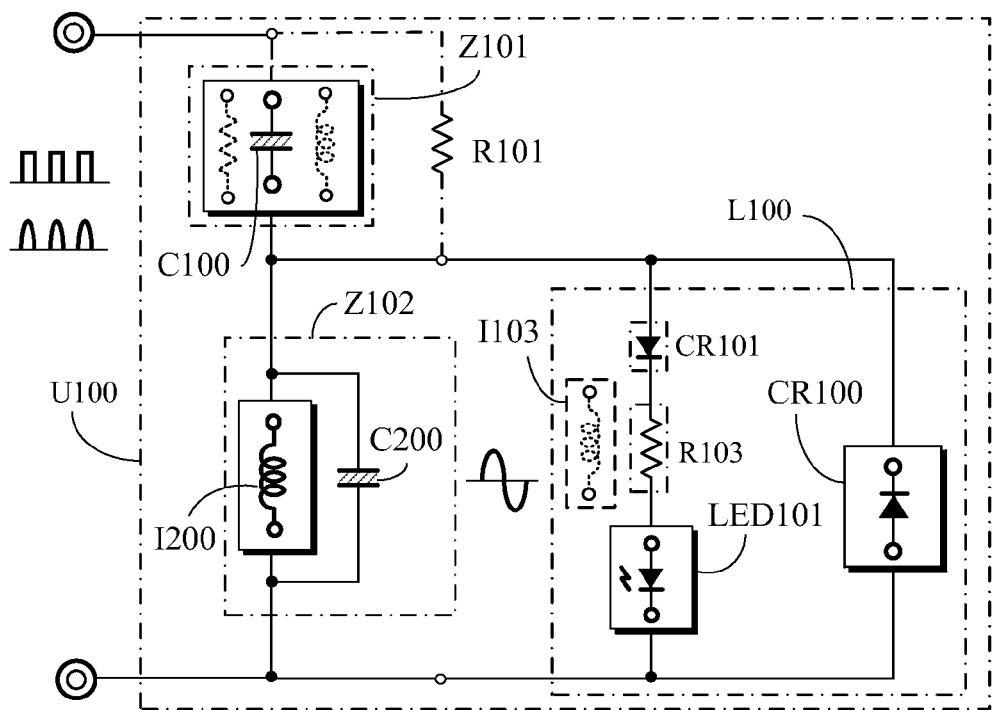
FIG. 3 is a circuit example schematic diagram of the present invention illustrating that the bidirectional conducting light emitting diode set (L100) is constituted by a first light emitting diode and a diode in parallel connection of reverse polarities.
Figure 4:
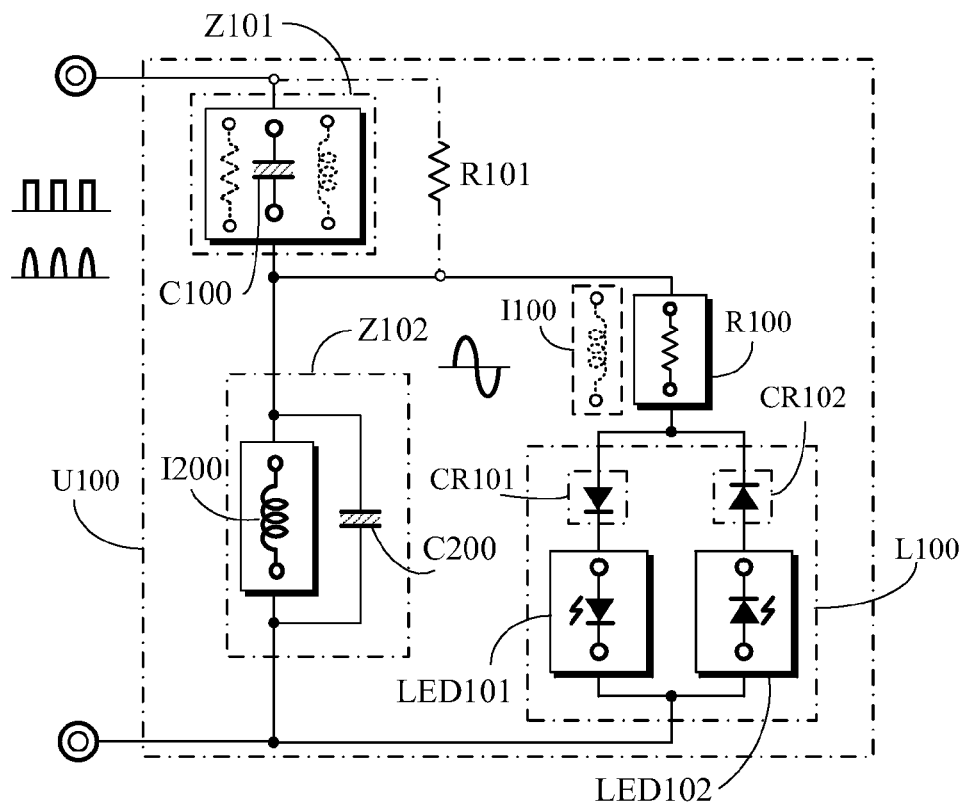
FIG. 4 is a circuit example schematic diagram illustrating that the bidirectional conducting light emitting diode set is series connected with a current limit resistor.

The said bi-directional light emitting diode drive circuit in pulsed power parallel resonance can be optionally installed with capacitive, inductive or resistive impedance components as needed, whereof the first impedance (Z101) can be constituted by at least one of the three types of impedance components or the first impedance can be omitted to let the second impedance (Z102) to be directly parallel connected with the pulsed power source, whereof it is described in the following:

For convenience of description, the components listed in the circuit examples of the following exemplary embodiments are selected as in the following:

(1) A first impedance (Z101) and a second impedance (Z102) as well as a bi-directional conducting light emitting diode set (L100) are installed in the embodied examples. Nonetheless, the selected quantities are not limited in actual applications;

(2) The capacitive impedance of the capacitor is selected to represent the impedance components, thereby to constitute the first impedance (Z101) and the second impedance (Z102) in the embodied examples, whereof the capacitive, inductive and/or resistive impedance components can be optionally selected as needed in actual applications, whereby it is described in the following:

FIG. 2 is a circuit example schematic diagram of the present invention which is comprised of:

- A first impedance (Z101): it is constituted by a capacitor (C100) with especially referring to a bipolar capacitor at the quantity of one or more than ones, or the first impedance (Z101) can be optionally selected not to use as needed;
- A second impedance (Z102): It is constituted by at least one inductive component (I200) and at least one capacitor (C200) in parallel connection with specially referring to the constitution by an inductive impedance component and a bipolar capacitor, whereof its pulse period is the same as that of the pulsed power to appear parallel resonance status, whereof the quantity of the second impedance is one or more than ones;
- At least one first impedance (Z101) and at least one second impedance (Z102) are in series connection while the two ends of the said series connection is for receiving the pulsed power input, thereby to form divided power at the second impedance (Z102) in parallel resonance, whereof the divided power drives at least one bi-directional conducting light emitting diode set (L100);
- A bi-directional conducting light emitting diode set (L100): it is constituted by at least one first light emitting diode (LED101) and at least one second light emitting diode (LED102) in parallel connection of inverse polarities, whereof the numbers of the first light emitting diode (LED101) and the numbers of the second light emitting diode (LED102) can be the same or different, further, the first light emitting diode (LED101) and the second light emitting diode (LED102) can be respectively constituted by one forward current polarity light emitting diode; or two or more than two forward current polarity light emitting diodes in series or parallel connections; or three or more than three forward current polarity light emitting diodes in series or parallel connections or in series and parallel connections; the bi-directional conducting light emitting diode set (L100) can be optionally installed with one or more than one sets as needed, whereof it is parallel connected across the two ends of both or either of the first impedance (Z101) or the second impedance (Z102) to form divided power at two ends of both the first impedance (Z101) and the second impedance (Z102) by the power input, thereby to drive the bi-directional conducting light emitting diode set (L100) which is parallel connected across the two ends of the first impedance (Z101) or the second impedance (Z102) to emit light; or
- At least one bi-directional conducting light emitting diode set (L100) is parallel connected to the two ends of at least one second impedance (Z102) which is at parallel resonance with the pulse period of the pulsed power, thereby to be driven by the divided power across the two ends of the second impedance (Z102) while the first impedance (Z101) is used to limit current, whereof in case that the capacitor (C100) (such as a bipolar capacitor) is used as the first impedance component, the output current is limited by the capacitive impedance;

The first impedance (Z101), the second impedance (Z102) and the bi-directional conducting light emitting diode set (L100) are connected according to the aforesaid circuit structure to constitute the bi-directional light emitting diode drive circuit (U100);

Besides, based on the current distribution effect formed by the parallel connection of the bi-directional conducting light emitting diode set (L100) and the second impedance (Z102), the voltage variation rate across the two ends of the bi-directional conducting light emitting diode set (L100) corresponding to power source voltage variation can be reduced;

Selection of the first light emitting diode (LED101) and the second light emitting diode (LED102) which constitute the bi-directional conducting light emitting diode set (L100) in the bi-directional light emitting diode drive circuit (U100) includes the following:

1. A first light emitting diode (LED101) which can be constituted by one light emitting diode, or by more than one light emitting diodes in series connection of forward polarities, in parallel connection of the same polarity or in series and parallel connection;
2. A second light emitting diode (LED102) which can be constituted by one light emitting diode, or by more than one light emitting diodes in series connection of forward polarities, in parallel connection of the same polarity or in series and parallel connection;
3. The numbers of light emitting diodes which constitute the first light emitting diode (LED101) and the numbers of light emitting diodes which constitute the second light emitting diode (LED102) can be the same or different;
4. If the number of light emitting diodes which constitute either the first light emitting diode (LED101) or the second light emitting diode (LED102) respectively is one or more than one, the connecting relationship of the respective light emitting diodes can be in the same or different series connection, parallel connection, or series and parallel connection;
5. One of the first light emitting diode (LED101) or the second light emitting diode (LED102) can be replaced by a diode (CR100) while the current direction of the diode (CR100) and the working current direction of the reserved first light emitting diode (LED101) or the second light emitting diode (LED 102) are in parallel connection of reverse polarities;

Such as that FIG. 3 is a circuit example schematic diagram of the present invention illustrating that the bidirectional conducting light emitting diode set is constituted by a first light emitting diode and a diode in parallel connection of reverse polarities;

The bidirectional light emitting diode drive circuit in pulsed power parallel resonance is operated through the circuit function of the bidirectional light emitting diode drive circuit (U100), whereof in actual applications, as shown in FIGS. 1, 2 and 3, the following auxiliary circuit components can be optionally selected as needed to be installed or not installed while the quantity of the installation can be constituted by one or more than one, whereof in case more than one are selected, they can be selected based on circuit function requirements to be in series connection or parallel connection or series and parallel connection in corresponding polarities, whereof the optionally selected auxiliary circuit components include:

- A diode (CR101): It is optionally installed to series connected with the first light emitting diode (LED101), whereby to prevent reverse over-voltage;

A diode (CR102): It is optionally installed to series connected with the second light emitting diode (LED102), whereby to prevent reverse over-voltage;

A discharge resistor (R101): It is an optionally installed component, in case the capacitor (C100), such as a bipolar capacitor, is selected for the first impedance (Z101), it is parallel connected across the two ends of the capacitor (C100) in the first impedance (Z101) to release the residual current of capacitor (C100);

A current limit resistor (R103): It is an optionally installed component which is series connected with the first light emitting diode (LED101) of the bi-directional conducting light emitting diode set (L100) individually, whereby to limit the current passing through the first light emitting diode (LED101), whereof the current limit resistor (R103) can also be replaced by an inductive impedance (I103);

A current limit resistor (R104): It is an optionally installed component which is series connected with the second light emitting diode (LED102) of the bi-directional conducting light emitting diode set (L100) individually, whereby to limit the current passing through the second light emitting diode (LED102), whereof the current limit resistor (R104) can also be replaced by an inductive impedance (I104);

The bi-directional light emitting diode drive circuit (U100), of which if the first light emitting diode (LED101) and the second light emitting diode (LED102) are both disposed with the current limit resistors (R103) and (R104), a current limit resistor (R100) can be directly series connected to the bidirectional conducting light emitting diode set (L100) to replace or installed together with the current limit resistors (R103) and (R104) to obtain current limit function, whereof the current limit resistor (R100) can also be replaced by an inductive impedance component (I100); whereby the bidirectional light emitting diode drive circuit (U100) is constituted by the said circuit structure and selection of auxiliary circuit components as shown in FIG. 4 which is a circuit example schematic diagram illustrating that the bidirectional conducting light emitting diode set (L100) is series connected with a current limit resistor (R100).

Figure 5:
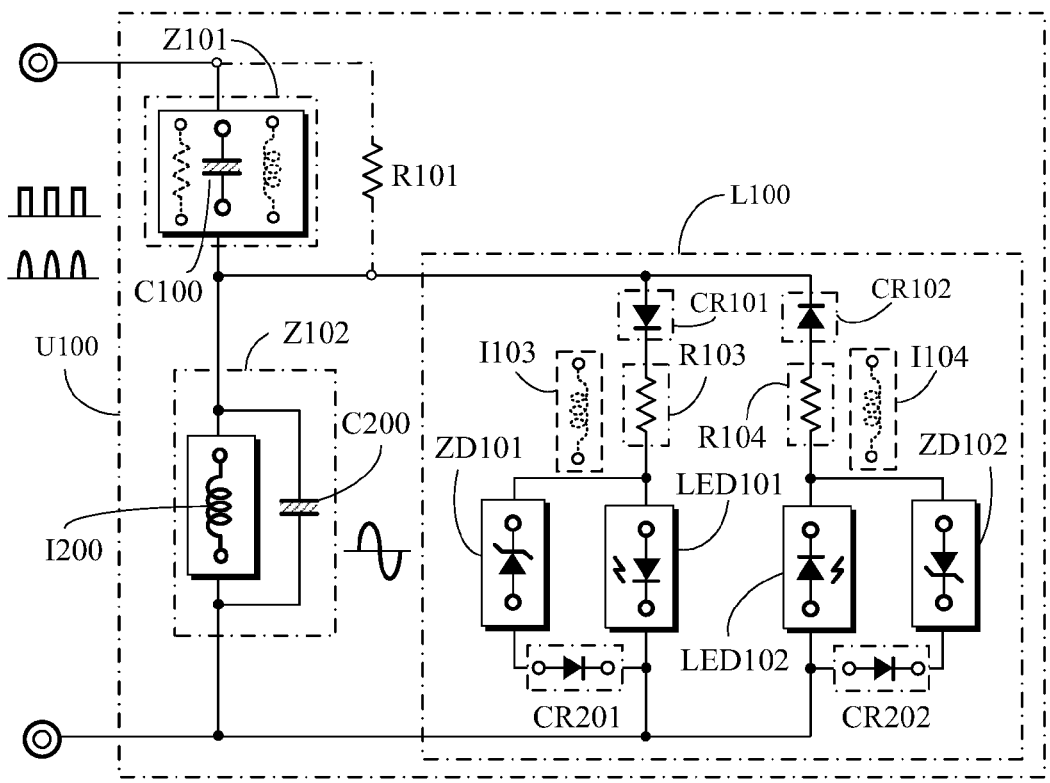
FIG. 5 is a circuit example schematic diagram illustrating that the bidirectional conducting light emitting diode set is further installed with a zener diode in the circuit of FIG. 2.
Figure 6:
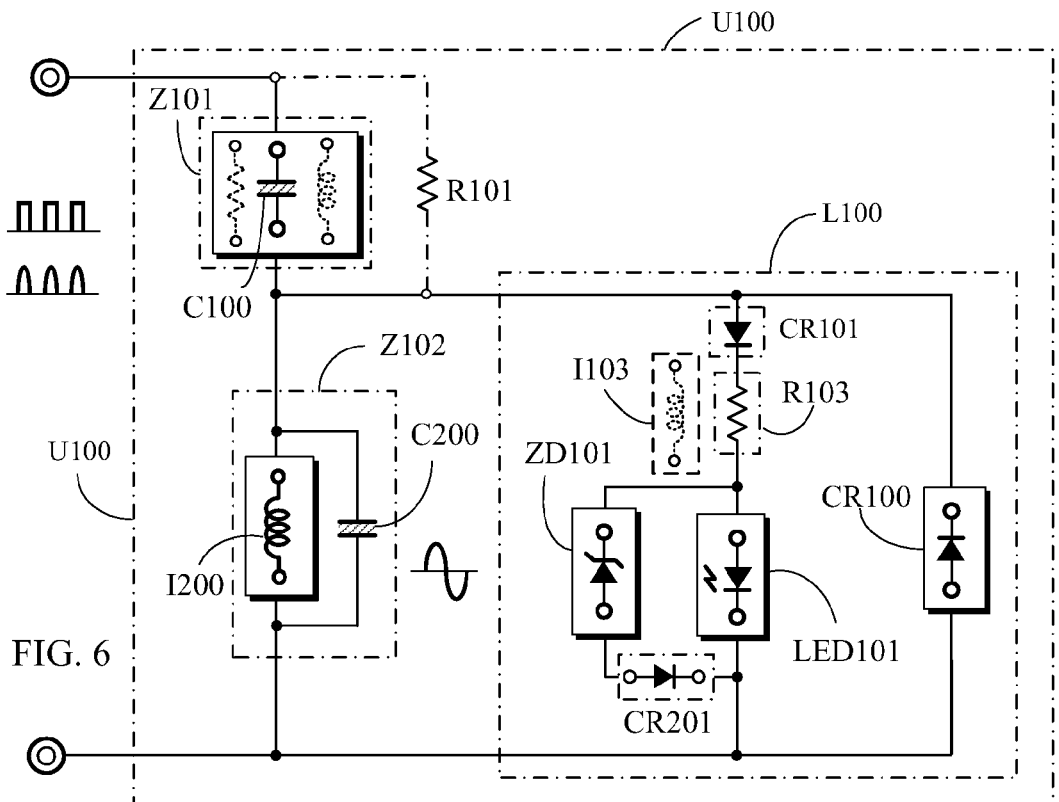
FIG. 6 is a circuit example schematic diagram illustrating that the bidirectional conducting light emitting diode set is further installed with a zener diode in the circuit of FIG. 3.

In addition, to protect the light emitting diode and to avoid the light emitting diode being damaged or reduced working life by abnormal voltage, in the bidirectional light emitting diode drive circuit (U100), as shown in FIG. 5 and 6, a zener diode can be respectively parallel connected across the two ends of the first light emitting diode (LED101) and the second light emitting diode (LED102) of the bidirectional conducting light emitting diode set (L100), or the zener diode can be first series connected with at least one diode to produce the function of zener voltage effect, then to be parallel connected across the two ends of the first light emitting diode (LED101) or the second light emitting diode (LED102);

FIG. 5 is a circuit example schematic diagram illustrating that the bidirectional conducting light emitting diode set is further installed with a zener diode in the circuit of FIG. 2.

FIG. 6 is a circuit example schematic diagram illustrating that the bidirectional conducting light emitting diode set is further installed with a zener diode in the circuit of FIG. 3.

Figure 7:
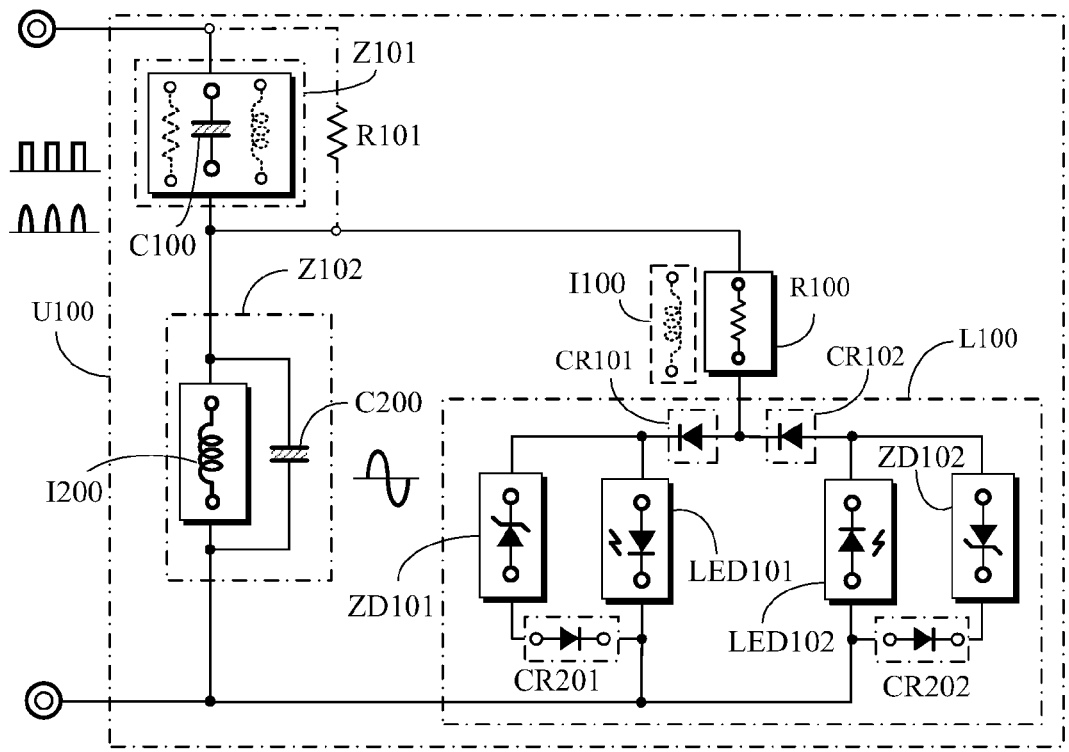
FIG. 7 is a circuit example schematic diagram illustrating that the bidirectional conducting light emitting diode set is further installed with a zener diode in the circuit of FIG. 4.

FIG. 7 is a circuit example schematic diagram illustrating that the bidirectional conducting light emitting diode set is further installed with a zener diode in the circuit of FIG. 4, whereof as shown in FIG. 7, it is comprised of that:

1. A zener diode (ZD101) is parallel connected across the two ends of the first light emitting diode (LED101) of the bi-directional conducting light emitting diode set (L100), whereof their polarity relationship is that the zener voltage of the zener diode (ZD101) is used to limit the working voltage across the two ends of the first light emitting diode (LED101);

Said zener diode (ZD101) can be optionally series connected with a diode (CR201) as needed, whereby the advantages are 1) the zener diode (ZD101) can be protected from reverse current; 2) both diode (CR201) and zener diode (ZD101) have temperature compensation effect.

2. If the second light emitting diode (LED102) is selected in the bi-directional conducting light emitting diode set (L100), a zener diode can be optionally series connected with the two ends of the said second light emitting diode (LED102), whereof their polarity relationship is that the zener voltage of the zener diode (ZD102) is used to limit the working voltage across the two ends of the second light emitting diode (LED102);

Said zener diode (ZD102) can be optionally series connected with a diode (CR202) as needed, whereby the advantages are 1) the zener diode (ZD102) can be protected from reverse current; 2) both diode (CR202) and zener diode (ZD102) have temperature compensation effect.

The zener diode is constituted by:

(1) A zener diode (ZD101) is parallel connected across the two ends of the first light emitting diode (LED101) of the bi-directional conducting light emitting diode set (L100), and a zener diode (ZD102) is parallel connected across the two ends of the second light emitting diode (LED102); or (2) The two zener diodes (ZD101) and (ZD102) are series connected in opposite directions and further parallel connected across the two ends of the bi-directional conducting light emitting diode set (L100); or (3) It is replaced by the diode of bi-directional zener effect which is parallel connected across the two ends of the bi-directional conducting light emitting diode set (L100); all of the aforesaid three circuits can avoid over high end voltage to the first light emitting diode (LED101) and the second light emitting diode (LED 102).

Figure 8:
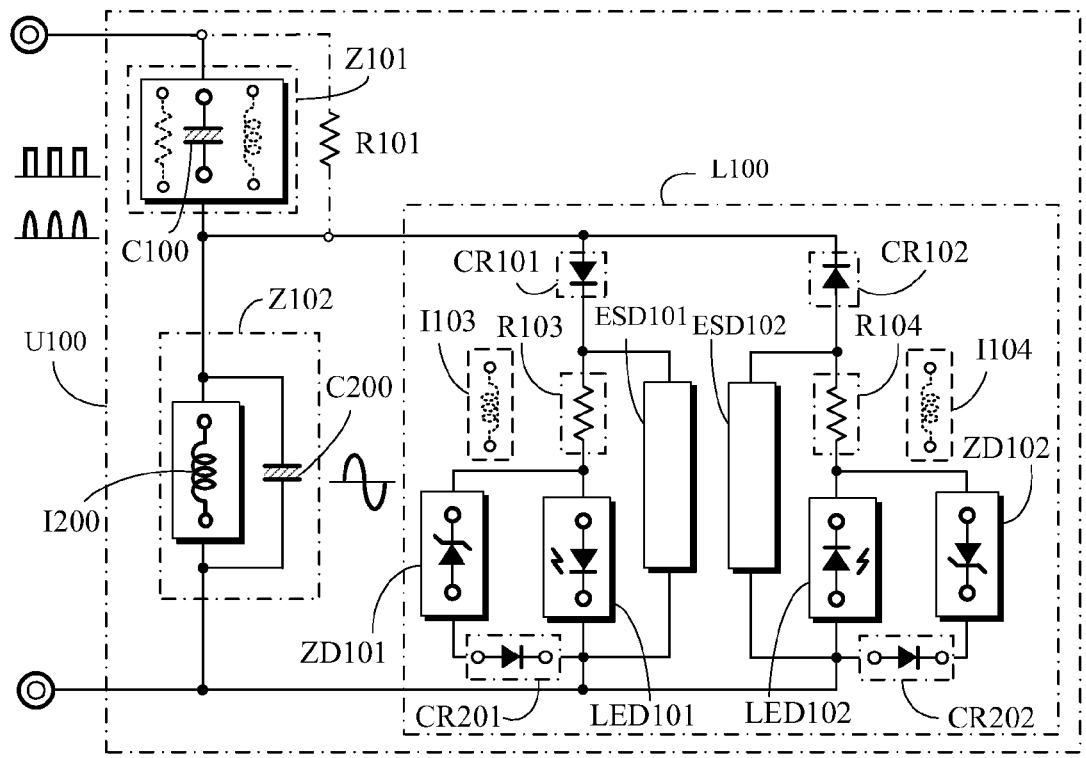
FIG. 8 is a circuit example schematic diagram illustrating that a charge/discharge device is parallel connected across the two ends of the light emitting diodes and current limit resistor in series connection in the circuit of FIG. 5.
Figure 9:
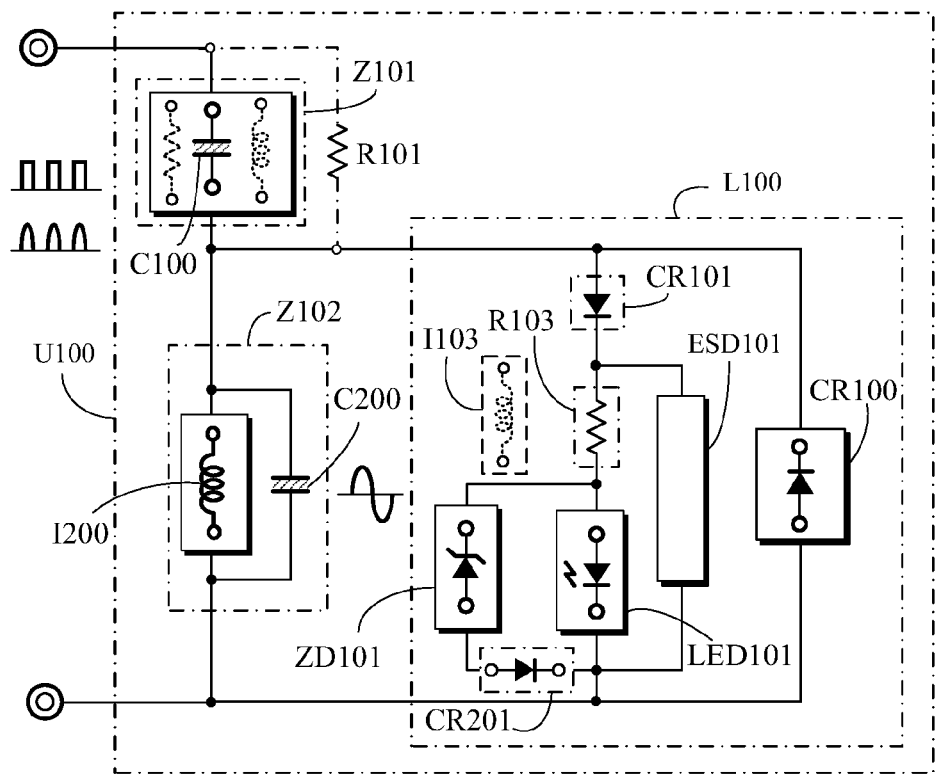
FIG. 9 is a circuit example schematic diagram illustrating that a charge/discharge device is parallel connected across the two ends of the light emitting diodes and the current limit resistor in series connection in the circuit of FIG. 6.
Figure 10:
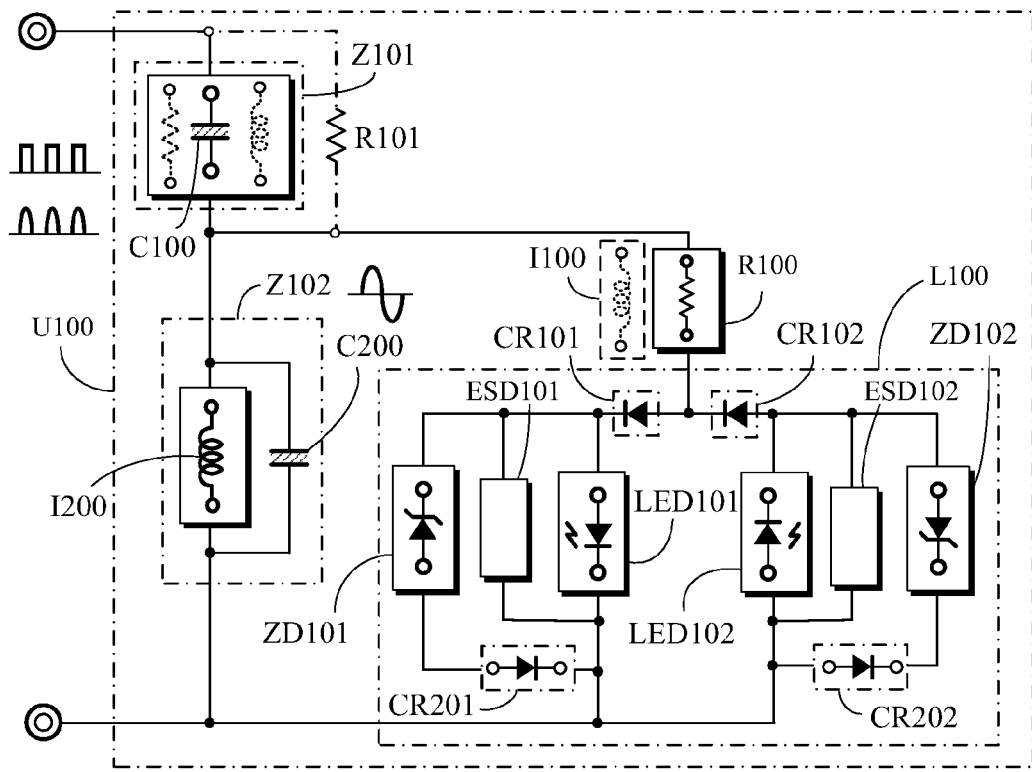
FIG. 10 is a circuit example schematic diagram illustrating that a charge/discharge device is parallel connected across the two ends of the light emitting diodes and the current limit resistor in series connection in the circuit of FIG. 7.

The bi-directional driving light emitting diode circuit (U100) of the bi-directional driving light emitting diode drive circuit in pulsed power parallel resonance as shown in the circuit examples of FIGS. 8, 9 and 10, whereof to promote the lighting stability of the light source produced by the light emitting diode, the first light emitting diode (LED101) can be installed with a charge/discharge device (ESD101), or the second light emitting diode (LED102) can be installed with a charge/discharge device (ESD102), whereof the charge/discharge device (ESD101) and the charge/discharge device (ESD102) have the random charging or discharging characteristics which can stabilize the lighting stability of the first light emitting diode (LED101) and the second light emitting diode (LED102), whereby to reduce their lighting pulsations; the aforesaid charge/discharge devices (ESD101), (ESD102) can be constituted by the conventional charging and discharging batteries, or super-capacitors or capacitors, etc;

The bi-directional light emitting diode drive circuit in pulsed power parallel resonance of the present invention can be further optionally installed with charge/discharge device as needed, whereof it includes:

1. The bi-directional light emitting diode drive circuit in pulsed power parallel resonance, whereof in its bi-directional light emitting diode drive circuit (U100), a charge/discharge device (ESD101) can be parallel connected across the two ends of the current limit resistor (R103) and the first light emitting diode (LED101) in series connection;

Or a charge/discharge device (ESD102) can be further parallel connected across the two ends of the current limit resistor (R104) and the second light emitting diode (LED 102) in series connection;

FIG. 8 is a circuit example schematic diagram illustrating that a charge/discharge device is parallel connected across the two ends of the light emitting diode and current limit resistor in series connection in the circuit of FIG. 5, whereof it is comprised of:

A charge/discharge device (ESD101) based on its polarity is parallel connected across the two ends of the first light emitting diode (LED101) and the current limit resistor (R103) in series connection, or is directly parallel connected across the two ends of the first light emitting diode (LED101), whereof the charge/discharge device (ESD101) has the random charge/discharge characteristics to stabilize the lighting operation and to reduce the lighting pulsation of the first light emitting diode (LED101);

If the second light emitting diode (LED102) is selected to use, a charge/discharge device (ESD102) based on its polarity is parallel connected across the two ends of the second light emitting diode (LED102) and the current limit resistor (R104) in series connection, or is directly parallel connected across the two ends of the second light emitting diode (LED102), whereof the charge/discharge device (ESD102) has the random charge/discharge characteristics to stabilize the lighting operation and to reduce the lighting pulsation of the second light emitting diode (LED102);

The aforesaid charge/discharge devices (ESD101), (ESD102) can be constituted by the conventional charging and discharging batteries, or super-capacitors or capacitors, etc;

2. The bi-directional light emitting diode drive circuit in pulsed power parallel resonance, whereof if a first light emitting diode (LED101) is selected and is reversely parallel connected with a diode (CR100) in the bi-directional light emitting diode drive circuit (U100), then its main circuit structure is as shown in FIG. 9 which is a circuit example schematic diagram illustrating that a charge/discharge device is parallel connected across the two ends of the light emitting diode and the current limit resistor in series connection in the circuit of FIG. 6, whereof a charge/discharge device (ESD101) based on its polarity is parallel connected across the two ends of the first light emitting diode (LED101) and the current limit resistor (R103) in series connection, whereof the charge/discharge device (ESD101) has the random charge/discharge characteristics to stabilize the lighting operation and to reduce the lighting pulsation of the first light emitting diode (LED101);

The aforesaid charge/discharge devices (ESD101), (ESD102) can be constituted by the conventional charging and discharging batteries, or super-capacitors or capacitors, etc;

3. In the bi-directional light emitting diode drive circuit (U100) of the bi-directional light emitting diode drive circuit in pulsed power parallel resonance, when the current limit resistor (R100) is selected to replace the current limit resistors (R103), (R104) for the common current limit resistor of the bi-directional conducting light emitting diode set (L100), or the current limit resistors (R103), (R104) and (R100) are not installed, the main circuit structure is as shown in FIG. 10 which is a circuit example schematic diagram illustrating that a charge/discharge device is parallel connected across the two ends of the light emitting diode and the current limit resistor in series connection in the circuit of FIG. 7, whereof it is comprised of that:

A charge/discharge device (ESD101) is directly parallel connected across the two ends of the first light emitting diode (LED101) at the same polarity, and a charge/discharge device (ESD102) is directly parallel connected across the two ends of the second light emitting diode (LED 102) at the same polarity, whereof the charge/discharge devices (ESD101), (ESD102) has the random charge or discharge characteristics;

The aforesaid charge/discharge devices (ESD101), (ESD102) can be constituted by the conventional charging and discharging batteries, or super-capacitors or capacitors, etc;

4. If the charge/discharge devices (ESD101) or (ESD102) used is uni-polar in the above said items 1, 2, 3, whereof after the first light emitting diode (LED101) is parallel connected with the uni-polar charge/discharge device (ESD101), a diode (CR101) of forward polarity can be optionally installed as needed to prevent reverse voltage from damaging the uni-polar charge/discharge device; whereof after the second light emitting diode (LED102) is parallel connected with the uni-polar charge/discharge device (ESD102), a diode (CR102) of forward polarity can be optionally installed as needed to prevent reverse voltage from damaging the uni-polar charge/discharge device;

5. The bi-polar charge/discharge device can be optionally parallel connected across the two ends of the bidirectional conducting light emitting diode set (L100) as needed.

Figure 11:
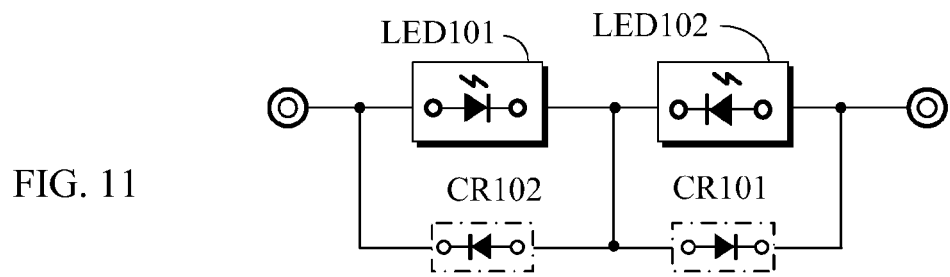
FIG. 11 is a circuit example schematic diagram of the bidirectional conducting light emitting diode set of the present invention illustrating that the first light emitting diode is reversely parallel connected with a diode, and the second light emitting diode is reversely parallel connected with a diode, whereby the two appear in series connection of opposite directions.

In addition, a charge/discharge device can be further installed across the two ends of the bidirectional conducting light emitting diode set (L100) in the bidirectional light emitting diode drive circuit (U100) for random charging/discharging, thereby besides of stabilizing the lighting stabilities of the first light emitting diode (LED101) and the second light emitting diode (LED102) of the bidirectional conducting light emitting diode set (L100), the charge/discharge device can provide its saved power during a power off to drive at least one of the first light emitting diode (LED101) or the second light emitting diode (LED102) to continue emitting light;

The aforesaid charge/discharge devices (ESD101), (ESD102) can be constituted by the conventional charging and discharging batteries, or super-capacitors or capacitors, etc;

The bidirectional conducting light emitting function of the diode in the said bidirectional conducting light emitting diode set (L100) is constituted by that:

(1) It is constituted by at least one first light emitting diode (LED101) and at least one second light emitting diode (LED102) in parallel connection of reverse polarities;

(2) At least one first light emitting diode (LED101) is series connected with a diode (CR101) in forward polarity, and at least one second light emitting diode (LED102) is series connected with a diode (CR102) in forward polarity, thereby the two are further parallel connected in inverse polarities;

(3) A diode (CR101) is parallel connected with at least one first light emitting diode (LED101) in inverse polarities and a diode (CR102) is parallel connected with at least one second light emitting diode (LED102) in inverse polarities, whereof the two are further series connected in opposite directions to constitute a bi-directional conducting light emitting diode set, whereof it is as shown in FIG. 11 which is a circuit example schematic diagram of the bidirectional conducting light emitting diode set of the present invention illustrating that the first light emitting diode is reversely parallel connected with a diode, and the second light emitting diode is reversely parallel connected with a diode, whereby the two appear in series connection of opposite directions;

(4) Or it can be constituted by conventional circuit combinations or components which allows the light emitting diode to receive power and to emit light bi-directionally.

The first impedance (Z101), the second impedance (Z102), the bidirectional conducting light emitting diode set (L100), the first light emitting diode (LED101), the second light emitting diode (LED102) and various aforesaid optional auxiliary circuit components shown in the circuit examples of FIGS. 1~11 are based on application needs, whereof they can be optionally installed or not installed as needed and the installation quantity include constitution by one, wherein if more than one component are selected in the application, the corresponding polarity relationship shall be determined based on circuit function requirement to do series connection, or parallel connection, or series and parallel connections; thereof it is constituted as the following:

1. The first impedance (Z101) can be constituted by one or more than one in series connection or parallel connection or series and parallel connection, whereof in multiple installations, each first impedance can be constituted by the same kind of capacitors (C100), inductive impedance components, or resistive impedance components, or other different kinds of impedance components, in which their impedance values can be the same or different;

2. The second impedance (Z102) can be constituted by the capacitor (C200) and inductive impedance component (I200) in parallel connection so that to appear parallel resonance with the pulse period of the pulsed power. Further, the second impedance (Z102) can be constituted by one or more than one in series connection or parallel connection or series and parallel connection, whereof in multiple installation, each second impedance can be constituted by the same kind of capacitive and inductive impedance components in parallel connection and appear parallel resonance with the pulse period of the pulsed power, whereof their impedance values can be the same or different, but the parallel resonance pulse periods are the same;

3. The first light emitting diode (LED101) can be constituted by one light emitting diode, or by more than one light emitting diodes in series connection of forward polarities, or in parallel connection of the same polarity, or in series and parallel connections;

4. The second light emitting diode (LED102) can be constituted by one light emitting diode, or by more than one light emitting diodes in series connection of forward polarities, or in parallel connection of the same polarity, or in series and parallel connections;

5. In the bi-directional light emitting diode drive circuit (U100):

(1) It can be optionally installed with one or more than one sets of bi-directional conducting light emitting diode sets (L100) in series connection, parallel connection, or series and parallel connection, whereof if one set or more than one sets are selected to be installed, they can be jointly driven by the divided power at a common second impedance (Z102) or driven individually by the divided power at the corresponding one of the multiple second impedances (Z102) which are in series connection or parallel connection;

(2) If the charge/discharge device (ESD101) or (ESD102) is installed in the bi-directional light emitting diode drive circuit (U100), the light emitting diodes (LED101) or (LED102) in the bi-directional conducting light emitting diode set (L100) is relied on the continuous DC power to emit light;

If the charge/discharge device (ESD101) or (ESD102) is not installed, current conduction to light emitting diode (LED101) or (LED102) is intermittent, whereby referring to the input voltage wave shape and duty cycle of current conduction, the light emitting forward current and the peak of light emitting forward voltage of each light emitting diode in the bi-directional conducting light emitting diode set (L100) can be correspondingly selected for the light emitting diodes (LED101) or (LED102), whereof the selections include the following:

1) The light emitting peak of forward voltage is lower than the rated forward voltage of light emitting diode (LED 101) or (LED 102); or 2) The rated forward voltage of light emitting diode (LED101) or (LED102) is selected to be the light emitting peak of forward voltage; or 3) If current conduction to light emitting diode (LED101) or (LED102) is intermittent, the peak of light emitting forward voltage can be correspondingly selected based on the duty cycle of current conduction as long as the principle of that the peak of light emitting forward voltage does not damage the light emitting diode (LED101) or (LED102) is followed;

4) Based on the value and wave shape of the aforesaid light emitting forward voltage, the corresponding current value and wave shape from the forward voltage vs. forward current ratio are produced; however the peak of light emitting forward current shall follow the principle not to damage the light emitting diode (LED101) or (LED102);

5) The luminosity or the stepped or step-less luminosity modulation of the forward current vs. relative luminosity can be controlled based on the aforesaid value and wave shape of forward current.

Figure 12:
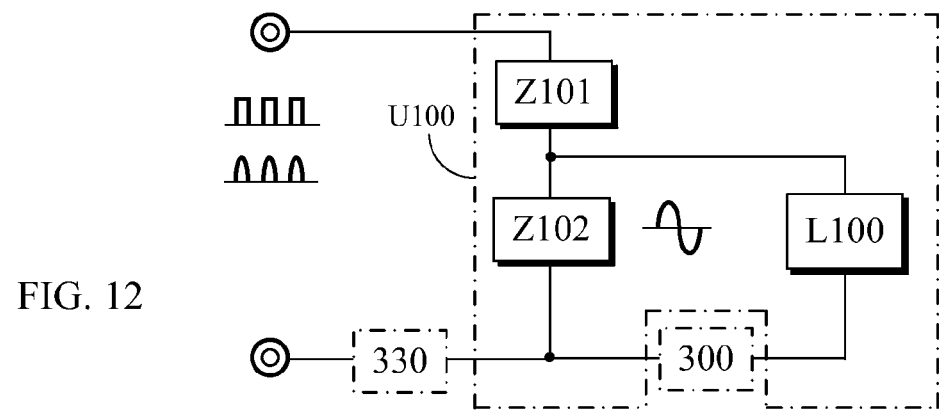
FIG. 12 is a circuit example schematic block diagram of the present invention which is series connected to the power modulator of series connection type.
Figure 13:
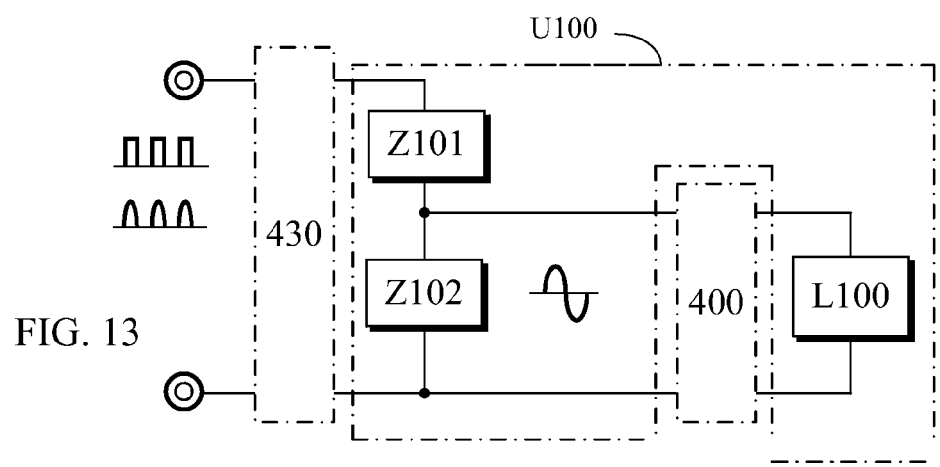
FIG. 13 is a circuit example schematic block diagram of the present invention which is parallel connected to the power modulator of parallel connection type.
Figure 14:
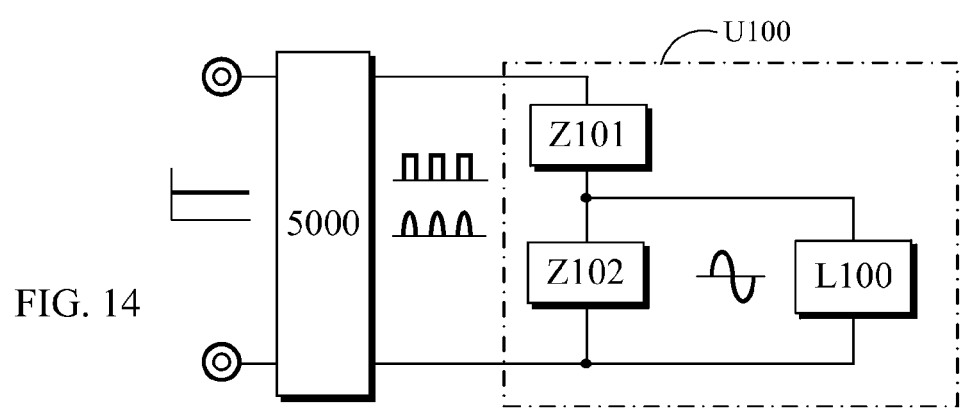
FIG. 14 is a circuit example schematic block diagram of the present invention driven by the DC to DC converter output power.

6. The diode (CR100), diode (CR101), diode (CR102), diode (CR201) and diode (CR202) can be constituted by one diode, or by more than one diodes in series connection of forward polarities, or in parallel connection of same polarities, or in series and parallel connection, whereof the said devices can be optionally installed as needed;

7. The discharge resistor (R101), current limit resistor (R100), current limit resistor (R103), and current limit resistor (R104) can be constituted by one resistor, or by more than one resistors in series connection or in parallel connection or in series and parallel connection, whereof the said devices can be optionally installed as needed;

8. The inductive impedance component (I100) and the inductive impedance component (I103) can be constituted by one impedance component, or by more than one impedance in series connection or in parallel connection or in series and parallel connection, whereof the said devices can be optionally installed as needed;

9. The zener diode (ZD101) or the zener diode (ZD102) can be constituted by one zener diode, or by more than one zener diode in series connection of forward polarities, or in parallel connection of the same polarity, or in series and parallel connection, whereof the said devices can be optionally installed as needed;

10. The charge/discharge device (ESD101), (ESD102) can be constituted by one, or by more than one in series connection of forward polarities, or in parallel connection of the same polarity, or in series and parallel connection, whereof the said devices can be optionally installed as needed;

In the application of the bi-directional light emitting diode drive circuit (U100), the following DC power sources can be inputted, including:

(1) DC pulsed power; or (2) The DC pulsed power with constant or variable voltage and constant or variable periods converted from DC power source; or
(3) The DC pulsed power with constant or variable voltage and constant or variable periods converted from DC power which is further rectified from AC power; or
(4) The half-wave or full-wave DC pulsed power rectified from AC power with constant or variable voltage and constant or variable frequency;

The following active modulating circuit devices can be further optionally combined as needed, whereof various applied circuits are the following:

1. FIG. 12 is a circuit example schematic block diagram of the present invention which is series connected to the power modulator of series connection type, whereof the power modulator of series connection type is constituted by the following:

A DC power modulator of series connection type (330), which is constituted by conventional electromechanical components or solid state power components and related electronic circuit components to modulate the DC pulsed power output;

A bi-directional power modulator of series connection type (300), which is constituted by the conventional electromechanical components or solid state power components and related electronic circuit components to modulate the bi-directional power output;

The circuit function operations are the following:

(1) The DC power modulator of series connection type (330) can be optionally installed as needed to be series connected with the bi-directional light emitting diode drive circuit (U100), whereby to receive the DC pulsed power from the power source, whereof the DC pulsed power is modulated by the DC power modulator of series connection type (330) to execute power modulations such as pulse width modulation or current conduction phase angle control, or impedance modulation, etc. to drive the bi-directional light emitting diode drive circuit (U100); or (2) The bi-directional power modulator of series connection type (300) can be optionally installed as needed to be series connected between the second impedance (Z102) and the bi-directional conducting light emitting diode set (L100), whereby the bi-directional AC divided power in parallel resonance from the two ends of the second impedance (Z102) is modulated by the bi-directional power modulator of series connection type (300) to execute power modulations such as pulse width modulation or current conduction phase angle control, or impedance modulation, etc. to drive the bi-directional conducting light emitting diode set (L100);

2. FIG. 13 is a circuit example schematic block diagram of the present invention which is parallel connected to the power modulator of parallel connection type, whereof the power modulator of the parallel connection type is constituted by the following:

A DC power modulator of parallel connection type (430) is constituted by conventional electromechanical components or solid state power components and related electronic circuit components to modulate the output power of DC pulsed power;

The bi-directional power modulator of parallel connection type (400) which is constituted by conventional electromechanical components or solid state power components and related electronic circuit components to modulate the output power of the bi-directional power;

The circuit operating functions are the following:

(1) The DC power modulator of parallel connection type (430) can be optionally installed as needed, whereof its output ends are parallel connected with the bi-directional light emitting diode drive circuit (U100) while its input ends are arranged to receive the DC power from the power source, whereof the DC pulsed power is modulated by the DC power modulator of parallel connection type (430) to execute power modulations such as pulse width modulation or current conduction phase angle control, or impedance modulation, etc. to drive the bi-directional light emitting diode drive circuit (U100); or (2) The bi-directional power modulator of parallel connection type (400) can be optionally installed as needed, whereof its output ends are parallel connected with the input ends of the bi-directional conducting light emitting diode set (L100) while the input ends of the bi-directional power modulator of parallel connection type (400) are parallel connected with the second impedance (Z102), and whereby the bi-directional AC divided power in parallel resonance across the two ends of the second impedance (Z102) is modulated by the bi-directional power modulator of parallel connection type (400) to execute power modulations such as pulse width modulation or current conduction phase angle control, or impedance modulation, etc. to drive the bi-directional conducting light emitting diode set (L100);

3. FIG. 14 is a circuit example schematic block diagram of the present invention driven by the power outputted from a DC to DC converter, whereof the DC to DC converter is constituted by:

A DC to DC converter (5000) which is constituted by conventional electromechanical components or solid state power components and related electronic circuit components, whereof its input ends receive DC power while its output ends provide output DC pulsed power which can be optionally selected to be a constant or variable voltage and constant or variable periods;

The circuit operating functions are the following:

A DC to DC converter (5000), in which its input ends receive DC power while its output ends provide DC pulsed power, wherein the bi-directional light emitting diode drive circuit (U100) is parallel connected with the output ends of the DC to DC converter (5000), and the input ends of the DC to DC converter (5000) receive the optionally selected DC power with constant or variable voltage, or the DC power rectified from AC power;

The output ends of the DC to DC converter (5000) provide output DC pulsed power which can be optionally selected to be a constant or variable voltage and constant or variable periods to control and drive the bi-directional light emitting diode drive circuit (U100);

In addition, the output power of the DC to DC converter (5000) can be operated to output to the bi-directional light emitting diode drive circuit (U100) in series resonance, or to modulate its power output for pulse width modulation or current conduction phase angle control, or impedance modulation, etc to control and drive the bi-directional light emitting diode drive circuit (U100);

4. The bi-directional light emitting diode drive circuit (U100) is series connected with a conventional impedance component (500) and is further parallel connected with the power source, whereof the impedance component (500) includes:

(1) An impedance component (500): it is constituted by a component with resistive impedance characteristics; or (2) An impedance component (500): it is constituted by a component with inductive impedance characteristics; or (3) An impedance component (500): it is constituted by a component with capacitive impedance characteristics; or (4) An impedance component (500): it is constituted by a single impedance component with the combined impedance characteristics of at least two of the resistive impedance, or inductive impedance, or capacitive impedance simultaneously, thereby to provide DC or AC impedances; or (5) An impedance component (500): it is constituted by a single impedance component with the combined impedance characteristics of the inductive impedance and capacitive impedance, whereof its inherent resonance frequency is the same as the frequency or period of bidirectional or unidirectional pulsed power, thereby to produce a parallel resonance status; or (6) An impedance component (500): it is constituted by capacitive impedance components, or inductive impedance components, or resistive impedance components, including one or more than one kind of one and more than one impedance component, or two or more than two kinds of impedance components in series connection, or parallel connection, or series and parallel connections, thereby to provide a DC or AC impedance; or (7) An impedance component (500): it is constituted by the mutual series connection of a capacitive impedance component and an inductive impedance component, whereof its inherent series resonance frequency is the same as the frequency or period of bidirectional or unidirectional pulsed power, thereby to produce a series resonance status and the end voltage across two ends of the capacitive impedance component or the inductive impedance component appear in series resonance correspondingly;

Or the capacitive impedance and the inductive impedance are in mutual parallel connection, whereby its inherent parallel resonance frequency is the same as the frequency or period of bi-directional or uni-directional pulsed power, thereby to produce a parallel resonance status and appear the corresponding end voltage.

Figure 15:
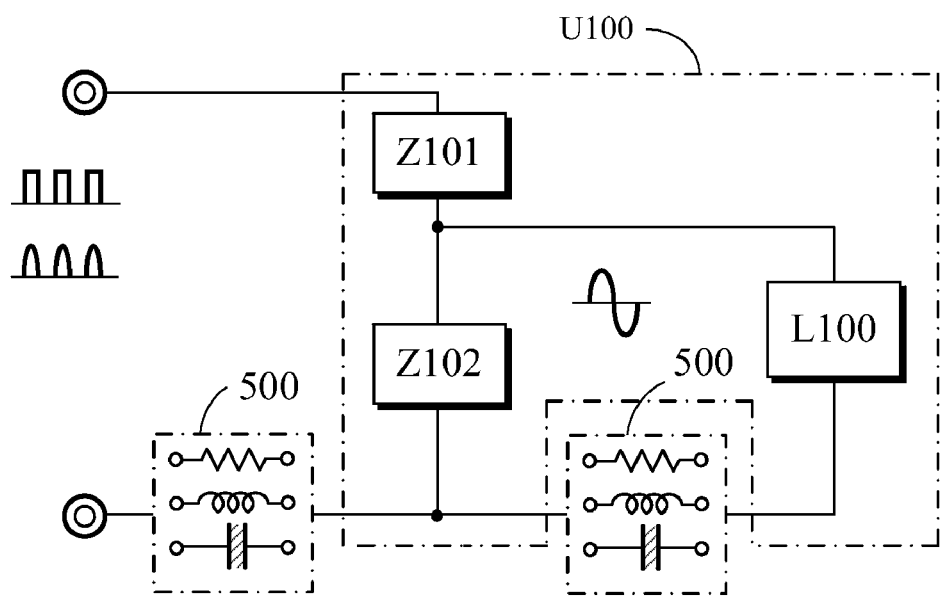
FIG. 15 is a circuit example schematic block diagram of the present invention which is series connected with impedance components.
Figure 16:
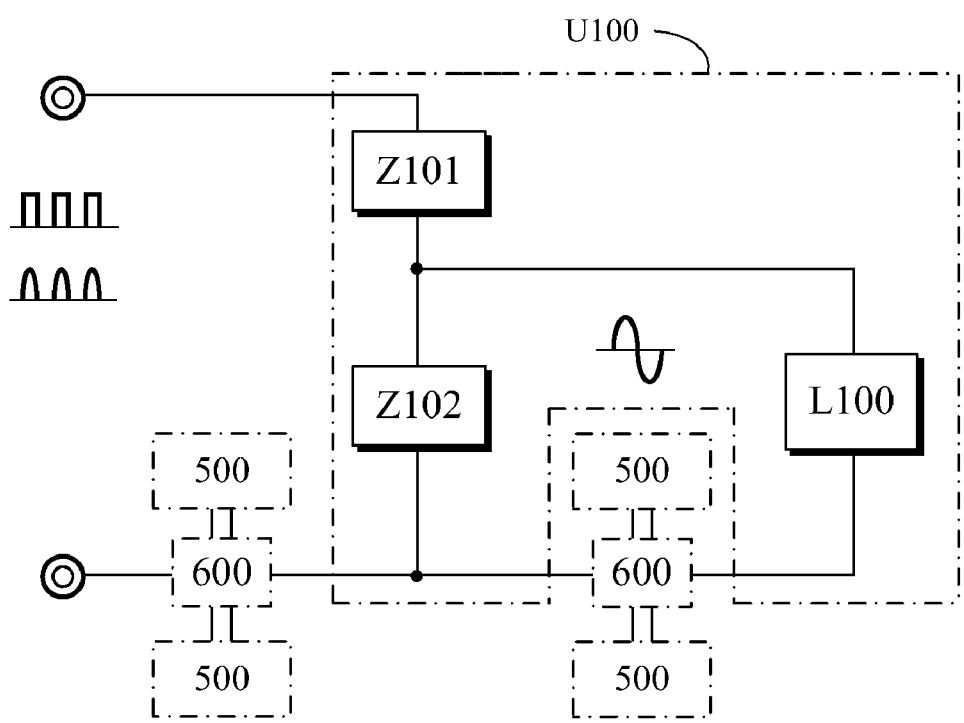
FIG. 16 is a circuit example schematic block diagram of the present invention illustrating that the impedance components in series connection execute series connection, or parallel connection, or series and parallel connection by means of the switching device.
Figure 17:
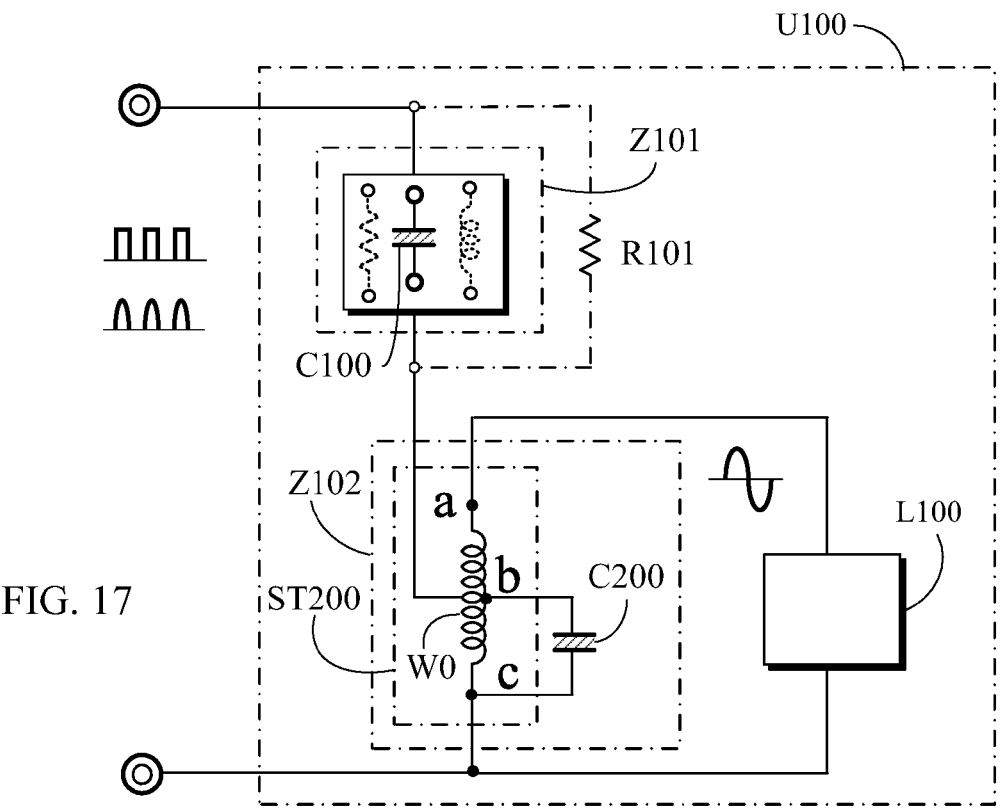
FIG. 17 is a circuit example schematic diagram of the present invention illustrating that the inductive impedance component of the second impedance is replaced by the self-coupled voltage change power supply side winding of the self-coupled transformer thereby to constitute a voltage rise.
Figure 18:
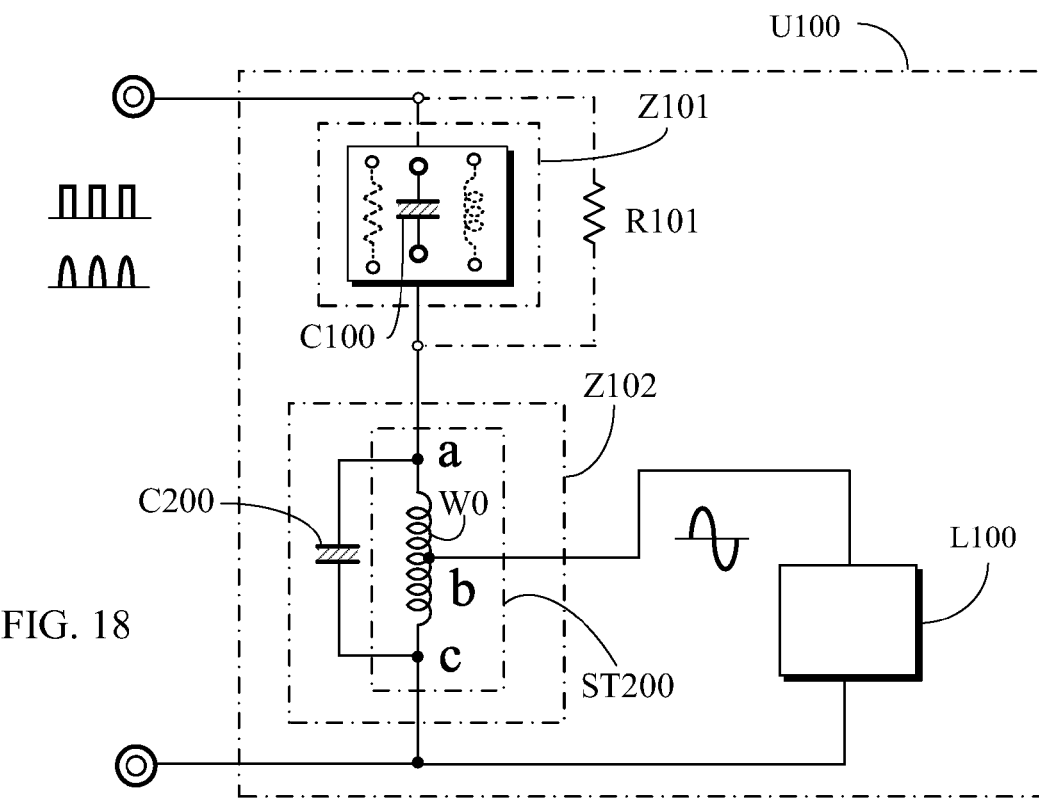
FIG. 18 is a circuit example schematic diagram of the present invention illustrating that the inductive impedance component of the second impedance is replaced by the self-coupled voltage change power supply side winding of the self-coupled transformer thereby to constitute a voltage drop.
Figure 19:
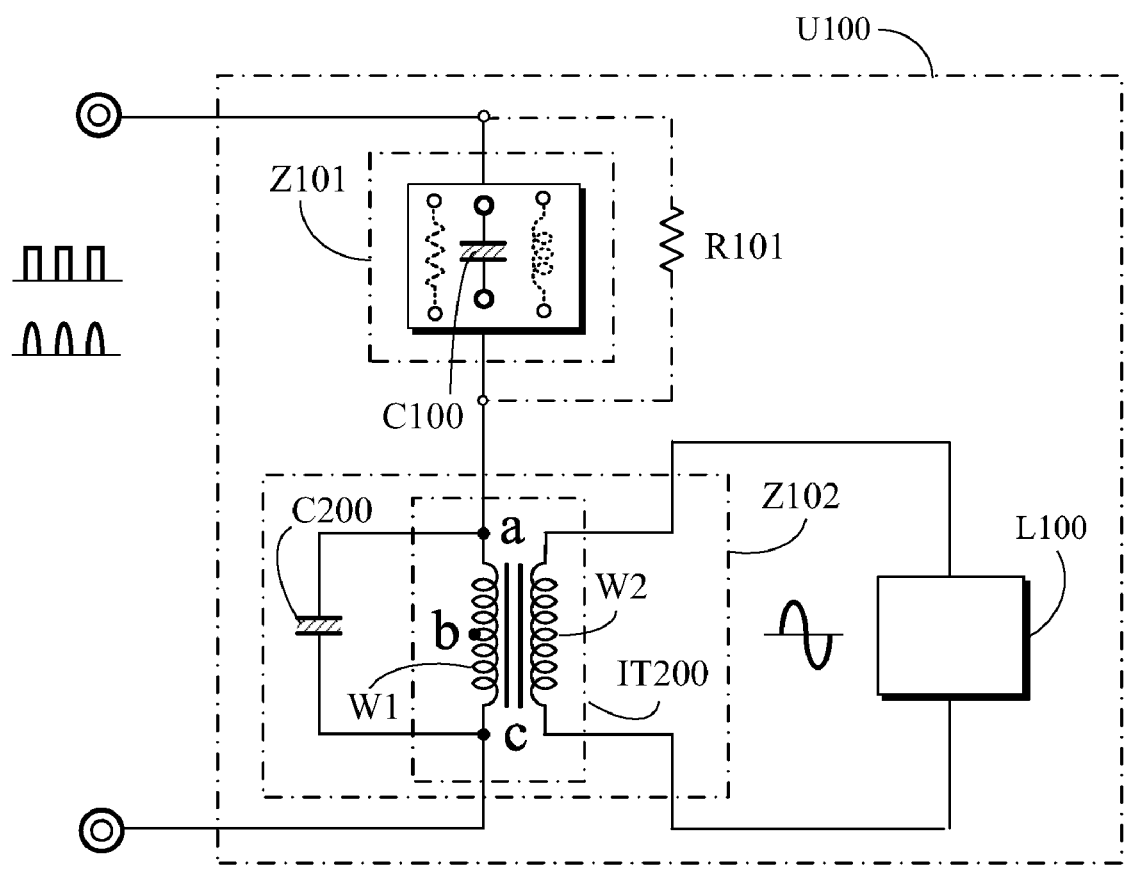
FIG. 19 is a circuit example schematic diagram of the present invention illustrating that the inductive impedance component of the second impedance is replaced by the primary side winding of the separating type transformer with separating type voltage change winding.

FIG. 15 is a circuit example schematic block diagram of the present invention being series connected with impedance components;

5. At least two impedance components (500) as said in the item 4 execute switches between series connection, parallel connection and series and parallel connection bye means of the switching device (600) which is constituted by electromechanical components or solid state components, whereby to modulate the power transmitted to the bi-directional light emitting diode drive circuit (U100), wherein FIG. 16 is a circuit example schematic block diagram of the present invention illustrating that the impedance components in series connection execute series connection, or parallel connection, or series and parallel connection by means of the switching device;

The bi-directional light emitting diode drive circuit in pulsed power parallel resonance, in which the optionally installed inductive impedance component (I200) of the second impedance (Z102) can be further replaced by the power supply side winding of a transformer with inductive effect, whereof the transformer can be a self-coupled transformer (ST200) with self-coupled voltage change winding or a transformer (IT200) with separated voltage change winding;

FIG. 17 is a circuit example schematic diagram of the present invention illustrating that the inductive impedance component of the second impedance is replaced by the self-coupled voltage change power supply side winding of the self-coupled transformer thereby to constitute a voltage rise, whereof as shown in FIG. 17, the self-coupled transformer (ST200) has a self-coupled voltage change winding (W0) with voltage raising function, the b, c ends of the self-coupled voltage change winding (W0) of the self-coupled transformer (ST200) are the power supply side which replace the inductive impedance component (I200) of the second impedance (Z102) to be parallel connected with the capacitor (C200), whereof its inherent parallel resonance frequency after parallel connection produces a parallel resonance status with the pulse period of the pulsed power from power source, thereby to constitute the second impedance (Z102) which is series connected with the capacitor (C100) of the first impedance (Z101), further, the capacitor (C200) can be optionally parallel connected with the a, c taps or b, c taps of the self-coupled transformer (ST200), or other selected taps as needed, whereof the a, c output ends of the self-coupled voltage change winding (W0) of the self-coupled transformer (ST200) are arranged to provide AC power of voltage rise to drive the bidirectional conducting light emitting diode set (L100);

FIG. 18 is a circuit example schematic diagram of the present invention illustrating that the inductive impedance component of the second impedance is replaced by the self-coupled voltage change power supply side winding of the self-coupled transformer thereby to constitute a voltage drop, whereof as shown in FIG. 18, the self-coupled transformer (ST200) has a self-coupled voltage change winding (W0) with voltage drop function, in which the a, c ends of the self-coupled voltage change winding (W0) of the self-coupled transformer (ST200) are the power supply side which replace the inductive impedance component (I200) of the second impedance (Z102) to parallel connected with the capacitor (C200), whereof its inherent parallel resonance frequency after parallel connection produces a parallel resonance status with the pulse period of the pulsed power from power source, thereby to constitute the second impedance (Z102) which is series connected with the capacitor (C100) of the first impedance (Z101), further, the capacitor (C200) can be optionally parallel connected with the a, c taps or b, c taps of the self-coupled transformer (ST200), or other selected taps as needed, whereof the b, c output ends of the self-coupled voltage change winding (W0) of the self-coupled transformer (ST200) are arranged to provide AC power of voltage drop to drive the bidirectional conducting light emitting diode set (L100);

FIG. 19 is a circuit example schematic diagram of the present invention illustrating that the inductive impedance component of the second impedance is replaced by the primary side winding of the separating type transformer with separating type voltage change winding, whereof as shown in FIG. 19, the separating type transformer (IT200) is comprised of a primary side winding (W1) and secondary side winding (W2), in which the primary side winding (W1) and the secondary side winding (W2) are separated, whereof the primary side winding (W1) is parallel connected with the capacitor (C200), whereof its inherent parallel resonance frequency after parallel connection produces a parallel resonance status with the pulse period of the pulsed power from power source, thereby to constitute the second impedance (Z102) which is series connected with the capacitor (C100) of the first impedance (Z101), further, the capacitor (C200) can be optionally parallel connected with the a, c taps or b, c taps of the self-coupled transformer (ST200), or other selected taps as needed, whereof the output voltage of the secondary side winding (W2) of the separating type transformer (IT200) can be optionally selected to provide AC power of either voltage rise or voltage drop to drive the bidirectional conducting light emitting diode set (L100).

Through the above description, the inductive impedance component (I200) of the second impedance (Z102) is replaced by the power supply side winding of the transformer and is parallel connected with the capacitor (C200) to appear parallel resonance, thereby to constitute the second impedance while the secondary side of the separating type transformer (IT200) provides AC power of voltage rise or voltage drop to drive the bidirectional conducting light emitting diode set (L100).

Color of the individual light emitting diodes (LED101) and (LED102) of the bi-directional conducting light emitting diode set (L100) in the bi-directional light emitting diode drive circuit (U100) of the bi-directional light emitting diode drive circuit in pulsed power parallel resonance can be optionally selected to be constituted by one or more than one colors.

The relationships of location arrangement between the individual light emitting diodes (LED101) of the bi-directional conducting light emitting diode set (L100) in the bi-directional light emitting diode drive circuit (U100) of the bi-directional light emitting diode drive circuit in pulsed power parallel resonance include the following: 1) sequentially linear arrangement; 2) sequentially distributed in a plane; 3) crisscross-linear arrangement; 4) crisscross distribution in a plane; 5) arrangement based on particular geometric positions in a plane; 6) arrangement based on 3D geometric positions.

The bi-directional light emitting diode drive circuit in pulsed power parallel resonance, in which the embodiments of its bi-directional light emitting diode drive circuit (U100) are constituted by circuit components which include: 1) It is constituted by individual circuit components which are inter-connected; 2) At least two circuit components are combined to at least two partial functioning units which are further inter-connected; 3) All components are integrated to one structure.

As is summarized from above descriptions, progressive performances of power saving, low heat loss and low cost can be provided by the bi-directional light emitting diode drive circuit in pulsed power parallel resonance through charging/discharging the uni-polar capacitor to drive the light emitting diode.

The invention claimed is:
1. A bi-directional light emitting diode drive circuit in pulsed power parallel resonance, in which the circuit function and operation of the bi-directional light emitting diode drive circuit (U100) is comprises
  at least one first impedance which includes at least one capacitive or inductive or resistive impedance component;
  a second impedance which includes at least one capacitive impedance and at least one inductive component in parallel connection,
  wherein its inherent parallel resonance frequency is the same as the pulse period of the pulsed power to appear parallel resonance status; and
  at least one bi-directional conducting light emitting diode set which includes at least one first light emitting diode and at least one second light emitting diode in parallel connection of reverse polarities,
  wherein it is parallel connected with the two ends of the at least one second impedance while the two ends of at least one first impedance and at least one second impedance in series connection receive pulsed power input to form divided voltage across the two ends of the first impedance and second impedance respectively,
  wherein the divided power drives at least one bi-directional conducting light emitting diode set, thereby to constitute the bi-directional light emitting diode drive circuit in pulsed power parallel resonance; wherein:
  the first impedance (Z101), includes:

1) a capacitor (C100) or an inductive impedance component or a resistive impedance component, or one kind or more than one kind and one or more than one impedance components, or two kinds or more than two kinds of impedance components, wherein the impedance components are respectively one or more than one in series connection, or parallel connection, or series and parallel connection to provide DC or AC impedances; or
2) at least one capacitive impedance component and at least one inductive impedance component are mutually series connected to have the same pulse period as pulsed power source to appear series resonance status, or the at least one capacitive impedance component and the at least one inductive impedance component is configured to be mutually parallel connected to appear parallel resonance with the pulse period of the pulsed power source;
  the second impedance (Z102) includes at least one inductive impedance component (I200) and at least one capacitor (C200) in parallel connection to have the same pulse period as the pulsed power to appear corresponding impedance parallel resonance status and end voltage status;
  the first impedance (Z101) and the second impedance (Z102) are mutually series connected, wherein the two ends of the series connected first impedance (Z101) and the second impedance (Z102) are for inputting:
1) DC pulsed power; or
2) the DC pulsed power with constant or variable voltage and constant or variable periods converted from DC power source; or
3) the DC pulsed power with constant or variable voltage and constant or variable periods converted from DC power which is further rectified from AC power; or
4) the half-wave or full-wave DC pulsed power rectified from constant or variable AC power with constant or variable voltage and constant or variable frequency;
  a bi-directional conducting light emitting diode set (L100) includes at least one first light emitting diode (LED101) and at least one second light emitting diode (LED102) in parallel connection of inverse polarities, wherein the numbers of the first light emitting diode (LED101) and the numbers of the second light emitting diode (LED102) configured to be the same or different, further, the first light emitting diode (LED101) and the second light emitting diode (LED102) configured to include one forward current polarity light emitting diode; or two or more than two forward current polarity light emitting diodes in series or parallel connections; or three or more than three forward current polarity light emitting diodes in series or parallel connections or in series and parallel connections; the bi-directional conducting light emitting diode set (L100) configured to be installed with one or more than one sets as needed, wherein it is parallel connected across the two ends of both or either of the first impedance (Z101) or the second impedance (Z102) to form divided power at two ends of both the first impedance (Z101) and the second impedance (Z102) by the power input, thereby to drive the bi-directional conducting light emitting diode set (L100) to emit light;
  the bi-directional light emitting diode drive circuit in pulsed power parallel resonance, in which the first impedance (Z101) and the second impedance (Z102) of the bi-directional light emitting diode drive circuit (U100) as well as the bi-directional conducting light emitting diode set (L100) configured to be selected to be one or more than ones as needed;

the first impedance (Z101), the second impedance (Z102), the bi-directional conducting light emitting diode set (L100), the first light emitting diode (LED101), the second light emitting diode (LED102) and various optional auxiliary circuit components configured to be installed or not installed as needed and the installation quantity include constitution by one, wherein if more than one component are selected in the application, the corresponding polarity relationship shall be determined based on circuit function requirement to do series connection, or parallel connection, or series and parallel connections.

2. A bi-directional light emitting diode drive circuit in pulsed power parallel resonance as claimed in claim 1, wherein it is comprised of:

the first impedance (Z101) includes a capacitor (C100) with especially referring to a bipolar capacitor at the quantity of one or more than ones, or the first impedance (Z101) configured to be selected not to use as needed;

the second impedance (Z102) includes at least one inductive component (I200) and at least one capacitor (C200) in parallel connection with specially referring to the constitution by an inductive impedance component and a bipolar capacitor, wherein its pulse period is the same as that of the pulsed power to appear parallel resonance status, wherein the quantity of the second impedance is one or more than ones;

at least one first impedance (Z101) and at least one second impedance (Z102) are in series connection while the two ends of the said series connection is for receiving the pulsed power input, thereby to form divided power at the second impedance (Z102) in parallel resonance, wherein the divided power drives at least one bi-directional conducting light emitting diode set (L100);

a bi-directional conducting light emitting diode set (L100) includes at least one first light emitting diode (LED101) and at least one second light emitting diode (LED102) in parallel connection of inverse polarities, wherein the numbers of the first light emitting diode (LED101) and the numbers of the second light emitting diode (LED102) configured to be the same or different, further, the first light emitting diode (LED101) and the second light emitting diode (LED102) configured to include one forward current polarity light emitting diode; or two or more than two forward current polarity light emitting diodes in series or parallel connections; or three or more than three forward current polarity light emitting diodes in series or parallel connections or in series and parallel connections; the bi-directional conducting light emitting diode set (L100) configured to be installed with one or more than one sets as needed, wherein it is parallel connected across the two ends of both or either of the first impedance (Z101) or the second impedance (Z102) to form divided power at two ends of both the first impedance (Z101) and the second impedance (Z102) by the power input, thereby to drive the bi-directional conducting light emitting diode set (L100) which is parallel connected across the two ends of the first impedance (Z101) or the second impedance (Z102) to emit light; or the bi-directional conducting light emitting diode set (L100) is parallel connected to the two ends of at least one second impedance (Z102) which is at parallel resonance with the pulse period of the pulsed power, thereby to be driven by the divided power across the two ends of the second impedance (Z102) while the first impedance (Z101) is used to limit current, wherein in case that the capacitor (C100) (such as a bipolar capacitor) is used as the first impedance component, the output current is limited by the capacitive impedance;

the first impedance (Z101), the second impedance (Z102) and the bi-directional conducting light emitting diode set (L100) are connected according to the aforesaid circuit structure to constitute the bi-directional light emitting diode drive circuit (U100).

3. A bi-directional light emitting diode drive circuit in pulsed power parallel resonance as claimed in claim 1, wherein based on the current distribution effect formed by the parallel connection of the bi-directional conducting light emitting diode set (L100) and the second impedance (Z102), the voltage variation rate across the two ends of the bi-directional conducting light emitting diode set (L100) corresponding to power source voltage variation can be reduced.

4. A bi-directional light emitting diode drive circuit in pulsed power parallel resonance as claimed in claim 1, wherein the first impedance can be selected not to be installed, so as to let the second impedance (Z102) to be directly parallel connected with the pulsed power source.

5. A bi-directional light emitting diode drive circuit in pulsed power parallel resonance as claimed in claim 2, wherein the first impedance can be selected not to be installed, so as to let the second impedance (Z102) to be directly parallel connected with the pulsed power source.

6. A bi-directional light emitting diode drive circuit in pulsed power parallel resonance as claimed in claim 1, wherein one of the first light emitting diode (LED101) or the second light emitting diode (LED102) is configured to be replaced by a diode (CR100) while the current direction of the diode (CR100) and the working current direction of the reserved first light emitting diode (LED101) or the second light emitting diode (LED102) are in parallel connection of reverse polarities.

7. A bi-directional light emitting diode drive circuit in pulsed power parallel resonance as claimed in claim 1, wherein if the first light emitting diode (LED101) and the second light emitting diode (LED102) are both disposed with the current limit resistors (R103) and (R104), a current limit resistor (R100) is configured to be directly series connected to the bi-directional conducting light emitting diode set (L100) to replace or installed together with the current limit resistors (R103) and (R104) to obtain current limit function, wherein the current limit resistor (R100) can also be replaced by an inductive impedance component (I100); whereby the bi-directional light emitting diode drive circuit (U100) includes the said circuit structure and selection of auxiliary circuit components.

8. A bi-directional light emitting diode drive circuit in pulsed power parallel resonance as claimed in claim 1, wherein a zener diode is configured to be further respectively parallel connected at the two ends of the first light emitting diode (LED101) and the second light emitting diode (LED102) of the bi-directional conducting light emitting diode set (L100), or the zener diode is configured to be first series connected with at least one diode to produce the function of zener voltage effect, then to be parallel connected at the two ends of the first light emitting diode (LED101) or the second light emitting diode (LED102); wherein:

a zener diode (ZD101) is parallel connected across the two ends of the first light emitting diode (LED101) of the bi-directional conducting light emitting diode set (L100), wherein their polarity relationship is that the zener voltage of the zener diode (ZD101) is used to limit the working voltage across the two ends of the first light emitting diode (LED101);

said zener diode (ZD101) is configured to be series connected with a diode (CR201) as needed, whereby the advantages are 1) the zener diode (ZD101) is protected from reverse current; 2) both diode (CR201) and zener diode (ZD101) have temperature compensation effect;

if the second light emitting diode (LED102) is selected in the bi-directional conducting light emitting diode set (L100), a zener diode is configured to be series connected with the two ends of the said second light emitting diode (LED102), wherein their polarity relationship is that the zener voltage of the zener diode (ZD102) is used to limit the working voltage across the two ends of the second light emitting diode (LED102);

said zener diode (ZD102) is configured to be series connected with a diode (CR202) as needed, whereby the advantages are 1) the zener diode (ZD102) is configured to be protected from reverse current; 2) both diode (CR202) and zener diode (ZD102) have temperature compensation effect.

9. A bi-directional light emitting diode drive circuit in pulsed power parallel resonance as claimed in claim 7, wherein the zener diode includes:
   1) a zener diode (ZD101) is parallel connected across the two ends of the first light emitting diode (LED101) of the bi-directional conducting light emitting diode set (L100), and a zener diode (ZD102) is parallel connected across the two ends of the second light emitting diode (LED102); or
   2) the two zener diodes (ZD101) and (ZD102) are series connected in opposite directions and further parallel connected across the two ends of the bi-directional conducting light emitting diode set (L100); or
   3) it is replaced by the diode of bi-directional zener effect which is parallel connected across the two ends of the bi-directional conducting light emitting diode set (L100); all of the aforesaid three circuits can avoid over high end voltage to the first light emitting diode (LED101) and the second light emitting diode (LED102).

10. A bi-directional light emitting diode drive circuit in pulsed power parallel resonance as claimed in claim 1, wherein the first light emitting diode (LED101) is configured to be installed with a charge/discharge device (ESD101), or the second light emitting diode (LED102) is configured to be installed with a charge/discharge device (ESD102), wherein the charge/discharge device (ESD101) and the charge/discharge device (ESD102) have the random charging or discharging characteristics which can stabilize the lighting stability of the first light emitting diode (LED101) and the second light emitting diode (LED102), whereby to reduce their lighting pulsations; the aforesaid charge/discharge devices (ESD101), (ESD102) is configured to be include conventional charging and discharging batteries, or super-capacitors or capacitors.

11. A bi-directional light emitting diode drive circuit in pulsed power parallel resonance as claimed in claim 1, wherein the application circuit with additionally installed charge/discharge device includes:
   a charge/discharge device (ESD101) is configured to be parallel connected across the two ends of the current limit resistor (R103) and the first light emitting diode (LED101) in series connection;
   or a charge/discharge device (ESD102) is configured to be further parallel connected across the two ends of the current limit resistor (R104) and the second light emitting diode (LED102) in series connection.

12. A bi-directional light emitting diode drive circuit in pulsed power parallel resonance as claimed in claim 1, wherein it is configured to be further parallel connected a charge/discharge device across the two ends of the first and second light emitting diodes and current limit resistor in series connection; wherein:
   a charge/discharge device (ESD101) based on its polarity is parallel connected across the two ends of the first light emitting diode (LED101) and the current limit resistor (R103) in series connection, or is directly parallel connected across the two ends of the first light emitting diode (LED101), wherein the charge/discharge device (ESD101) has the random charge/discharge characteristics to stabilize the lighting operation and to reduce the lighting pulsation of the first light emitting diode (LED101);
   If the second light emitting diode (LED102) is selected to use, a charge/discharge device (ESD102) based on its polarity is parallel connected across the two ends of the second light emitting diode (LED102) and the current limit resistor (R104) in series connection, or is directly parallel connected across the two ends of the second light emitting diode (LED102), wherein the charge/discharge device (ESD102) has the random charge/discharge characteristics to stabilize the lighting operation and to reduce the lighting pulsation of the second light emitting diode (LED102);
   If a first light emitting diode (LED101) is selected and is reversely parallel connected with a diode (CR100) in the bi-directional light emitting diode drive circuit (U100), then its main circuit structure is that a charge/discharge device (ESD101) based on its polarity is parallel connected across the two ends of the first light emitting diode (LED101) and the current limit resistor (R103) in series connection, wherein the charge/discharge device (ESD101) has the random charge/discharge characteristics to stabilize the lighting operation and to reduce the lighting pulsation of the first light emitting diode (LED101);
   the aforesaid charge/discharge devices (ESD101), (ESD102) is configured to be include conventional charging and discharging batteries, or super-capacitors or capacitors.

13. A bi-directional light emitting diode drive circuit in pulsed power parallel resonance as claimed in claim 1, wherein in the bi-directional light emitting diode drive circuit (U100), when the current limit resistor (R100) is selected to replace the current limit resistors (R103), (R104) for the common current limit resistor of the bi-directional conducting light emitting diode set (L100), the main circuit structure is comprised of that:
   a charge/discharge device (ESD101) is directly parallel connected across the two ends of the first light emitting diode (LED101) at the same polarity, and a charge/discharge device (ESD102) is directly parallel connected across the two ends of the second light emitting diode (LED102) at the same polarity, wherein the charge/discharge devices (ESD101), (ESD102) has the random charge or discharge characteristics;
   the aforesaid charge/discharge devices (ESD101), (ESD102) is configured to be include conventional charging and discharging batteries, or super-capacitors or capacitors, etc.

14. A bi-directional light emitting diode drive circuit in pulsed power parallel resonance as claimed in claim 1, wherein a charge/discharge device is configured to be further installed across the two ends of the bi-directional conducting light emitting diode set (L100) for random charging/discharging, thereby besides of stabilizing the lighting stabilities of the first light emitting diode (LED101) and the second light emitting diode (LED102) of the bi-directional conducting light emitting diode set (L100), the charge/discharge device can provide its saved power during a power off to drive at least one of the first light emitting diode (LED101) or the second light emitting diode (LED102) to continue emitting light;

If the charge/discharge devices (ESD101) or (ESD102) used is uni-polar, after the first light emitting diode (LED101) is parallel connected with the uni-polar charge/discharge device (ESD101), a diode (CR101) of forward polarity is configured to be installed as needed to prevent reverse voltage from damaging the uni-polar charge/discharge device; wherein after the second light emitting diode (LED102) is parallel connected with the uni-polar charge/discharge device (ESD102), a diode (CR102) of forward polarity is configured to be installed as needed to prevent reverse voltage from damaging the uni-polar charge/discharge device;

the aforesaid charge/discharge devices (ESD101), (ESD102) is configured to be include conventional charging and discharging batteries, or super-capacitors or capacitors.

15. A bi-directional light emitting diode drive circuit in pulsed power parallel resonance as claimed in claim 1, wherein the constitution method of the bi-directional conducting light emitting function of the diode in the bi-directional conducting light emitting diode set (L100) includes that a diode (CR101) is parallel connected with at least one first light emitting diode (LED101) in inverse polarities and a diode (CR102) is parallel connected with at least one second light emitting diode (LED102) in inverse polarities, wherein the two are further series connected in opposite directions to constitute a bi-directional conducting light emitting diode set.

16. A bi-directional light emitting diode drive circuit in pulsed power parallel resonance as claimed in claim 1, wherein in the bi-directional light emitting diode drive circuit (U100), it is configured to be installed with one or more than one sets of bi-directional conducting light emitting diode sets (L100) in series connection, parallel connection, or series and parallel connection, wherein if one set or more than one sets are selected to be installed, they is configured to be jointly driven by the divided power at a common second impedance (Z102) or driven individually by the divided power at the corresponding one of the multiple second impedances (Z102) which are in series connection or parallel connection.

17. A bi-directional light emitting diode drive circuit in pulsed power parallel resonance as claimed in claim 1, wherein if the charge/discharge device is not installed, then current conduction to light emitting diode is intermittent, whereby referring to the input voltage wave shape and duty cycle of current conduction, the light emitting forward current and the peak of light emitting forward voltage of each light emitting diode in the bi-directional conducting light emitting diode set (L100) is configured to be correspondingly selected for the light emitting diodes; if current conduction to light emitting diode is intermittent, the peak of light emitting forward voltage is configured to be correspondingly selected based on the duty cycle of current conduction as long as the principle of that the peak of light emitting forward voltage does not damage the light emitting diode is followed.

18. A bi-directional light emitting diode drive circuit in pulsed power parallel resonance as claimed in claim 1, wherein if the charge/discharge device is not installed, then based on the value and wave shape of the aforesaid light emitting forward voltage, the corresponding current value and wave shape from the forward voltage vs. forward current ratio are produced; however the peak of light emitting forward current shall follow the principle not to damage the light emitting diode (LED101) or (LED102).

19. A bi-directional light emitting diode drive circuit in pulsed power parallel resonance as claimed in claim 1, wherein it is series connected to the power modulator of series connection type, wherein the power modulator of series connection type includes the following:

a DC power modulator of series connection type (330), which includes conventional electromechanical components or solid state power components and related electronic circuit components to modulate the DC pulsed power output;

a bi-directional power modulator of series connection type (300), which by includes the conventional electromechanical components or solid state power components and related electronic circuit components to modulate the bi-directional power output;

the circuit function operations are the following:

i. the DC power modulator of series connection type (330) is series connected with the bi-directional light emitting diode drive circuit (U100), whereby to receive the DC pulsed power from the power source, wherein the DC pulsed power is modulated by the DC power modulator of series connection type (330) to execute power modulations such as pulse width modulation or current conduction phase angle control, or impedance modulation to drive the bi-directional light emitting diode drive circuit (U100); or ii. the bi-directional power modulator of series connection type (300) is series connected between the second impedance (Z102) and the bi-directional conducting light emitting diode set (L100), whereby the bi-directional AC divided power in parallel resonance from the two ends of the second impedance (Z102) is modulated by the bi-directional power modulator of series connection type (300) to execute power modulations such as pulse width modulation or current conduction phase angle control, or impedance modulation to drive the bi-directional conducting light emitting diode set (L100).

20. A bi-directional light emitting diode drive circuit in pulsed power parallel resonance as claimed in claim 1, wherein it is parallel connected to the power modulator of parallel connection type, wherein the power modulator of the parallel connection type includes the following:

a DC power modulator of parallel connection type (430) includes conventional electromechanical components or solid state power components and related electronic circuit components to modulate the output power of DC pulsed power;

the bi-directional power modulator of parallel connection type (400) which includes conventional electromechanical components or solid state power components and related electronic circuit components to modulate the output power of the bi-directional power;

the circuit operating functions are the following:

1) the DC power modulator of parallel connection type (430) is installed, wherein its output ends are parallel connected with the bi-directional light emitting diode drive circuit (U100)while its input ends are arranged to receive the DC power from the power source, wherein the DC pulsed power is modulated by the DC power modulator of parallel connection type (430) to execute power modulations such as pulse width modulation or current conduction phase angle control, or impedance modulation to drive the bi-directional light emitting diode drive circuit (U100); or 2) the bi-directional power modulator of parallel connection type (400) is installed, wherein its output ends are parallel connected with the input ends of the bi-directional conducting light emitting diode set (L100) while the input ends of the bi-directional power modulator of parallel connection type (400) are parallel connected with the second impedance (Z102), and whereby the bi-directional AC divided power in parallel resonance across the two ends of the second impedance (Z102) is modulated by the bi-directional power modulator of parallel connection type (400) to execute power modulations such as pulse width modulation or current conduction phase angle control, or impedance modulation to drive the bi-directional conducting light emitting diode set (L100).

21. A bi-directional light emitting diode drive circuit in pulsed power parallel resonance as claimed in claim 1, wherein it is driven by the power outputted from a DC to DC converter, wherein:
a DC to DC converter (5000) which includes conventional electromechanical components or solid state power components and related electronic circuit components, wherein its input ends receive DC power while its output ends provide output DC pulsed power which is configured to be selected to be a constant or variable voltage and constant or variable periods;
the circuit operating functions are the following:
a DC to DC converter (5000), in which its input ends receive DC power while its output ends provide DC pulsed power, wherein the bi-directional light emitting diode drive circuit (U100) is parallel connected with the output ends of the DC to DC converter (5000), and the input ends of the DC to DC converter (5000) receive the selected DC power with constant or variable voltage, or the DC power rectified from AC power;
the output ends of the DC to DC converter (5000) provide output DC pulsed power which is configured to be selected to be a constant or variable voltage and constant or variable periods to control and drive the bi-directional light emitting diode drive circuit (U100);
addition, the output power of the DC to DC converter (5000) is configured to be operated to output to the bi-directional light emitting diode drive circuit (U100) in series resonance, or to modulate its power output for pulse width modulation or current conduction phase angle control, or impedance modulation, etc to control and drive the bi-directional light emitting diode drive circuit (U100).

22. A bi-directional light emitting diode drive circuit in pulsed power parallel resonance as claimed in claim 1, wherein the bi- directional light emitting diode drive circuit (U100) is series connected with a conventional impedance component (500) and is further parallel connected with the power source, wherein the impedance component (500) includes:
1) a component with resistive impedance characteristics; or
2) a component with inductive impedance characteristics; or
3) a component with capacitive impedance characteristics; or
4) a single impedance component with the combined impedance characteristics of at least two of the resistive impedance, or inductive impedance, or capacitive impedance simultaneously, thereby to provide DC or AC impedances; or
5) a single impedance component with the combined impedance characteristics of the inductive impedance and capacitive impedance, wherein its inherent resonance frequency is the same as the frequency or period of bi-directional or uni-directional pulsed power, thereby to produce a parallel resonance status; or
6) capacitive impedance components, or inductive impedance components, or resistive impedance components, including one or more than one kind of one and more than one impedance component, or two or more than two kinds of impedance components in series connection, or parallel connection, or series and parallel connections, thereby to provide a DC or AC impedance; or
7) the mutual series connection of a capacitive impedance component and an inductive impedance component, wherein its inherent series resonance frequency is the same as the frequency or period of bi-directional or uni-directional pulsed power, thereby to produce a series resonance status and the end voltage across two ends of the capacitive impedance component or the inductive impedance component appear in series resonance correspondingly;
or the capacitive impedance and the inductive impedance are in mutual parallel connection, whereby its inherent parallel resonance frequency is the same as the frequency or period of bi-directional or uni-directional pulsed power, thereby to produce a parallel resonance status and appear the corresponding end voltage.

23. A bi-directional light emitting diode drive circuit in pulsed power parallel resonance as claimed in claim 1, wherein the installed inductive impedance component (I200) of the second impedance (Z102) is configured to be further replaced by the power supply side winding of a transformer with inductive effect, wherein the self-coupled transformer (ST200) has a self-coupled voltage change winding (WO) with voltage raising function, the b, c ends of the self-coupled voltage change winding (WO) of the self- coupled transformer (ST200) are the power supply side which replace the inductive impedance component (I200) of the second impedance (Z102) to be parallel connected with the capacitor (C200), wherein its inherent parallel resonance frequency after parallel connection produces a parallel resonance status with the pulse period of the pulsed power from power source, thereby to constitute the second impedance (Z102) which is series connected with the capacitor (C100) of the first impedance (Z101), further, the capacitor (C200) is configured to be parallel connected with the a, c taps or b, c taps of the self-coupled transformer (ST200), or other selected taps as needed, wherein the a, c output ends of the self-coupled voltage change winding (WO) of the self-coupled transformer (ST200) are arranged to provide AC power of voltage rise to drive the bi-directional conducting light emitting diode set (L100).

24. A bi-directional light emitting diode drive circuit in pulsed power parallel resonance as claimed in claim 1, wherein the installed inductive impedance component (I200) of the second impedance (Z102) is configured to be further replaced by the power supply side winding of a transformer with inductive effect, wherein the self-coupled transformer (ST200) has a self-coupled voltage change winding (WO) with voltage drop function, in which the a, c ends of the self-coupled voltage change winding (WO) of the self-coupled transformer (ST200) are the power supply side which replace the inductive impedance component (I200) of the second impedance (Z102) to parallel connected with the capacitor (C200), wherein its inherent parallel resonance frequency after parallel connection produces a parallel resonance status with the pulse period of the pulsed power from power source, thereby to constitute the second impedance (Z102) which is series connected with the capacitor (C100) of the first impedance (Z101), further, the capacitor (C200) is configured to be parallel connected with the a, c taps or b, c taps of the self-coupled transformer (ST200), or other selected taps as needed, wherein the b, c output ends of the self-coupled voltage change winding (WO) of the self-coupled transformer (ST200) are arranged to provide AC power of voltage drop to drive the bi-directional conducting light emitting diode set (L100).

25. A bi-directional light emitting diode drive circuit in pulsed power parallel resonance as claimed in claim 1, wherein the installed inductive impedance component (I200) of the second impedance (Z102) is configured to be further replaced by the power supply side winding of a transformer with inductive effect, wherein the separating type transformer (IT200) is comprised of a primary side winding (W1) and secondary side winding (W2), in which the primary side winding (W1) and the secondary side winding (W2) are separated, wherein the primary side winding (W1) is parallel connected with the capacitor (C200), wherein its inherent parallel resonance frequency after parallel connection produces a parallel resonance status with the pulse period of the pulsed power from power source, thereby to constitute the second impedance (Z102) which is series connected with the capacitor (C100) of the first impedance (Z101), further, the capacitor (C200) is configured to be parallel connected with the a, c taps or b, c taps of the self-coupled transformer (ST200), or other selected taps as needed, wherein the output voltage of the secondary side winding (W2) of the separating type transformer (IT200) is configured to be selected to provide AC power of either voltage rise or voltage drop to drive the bi-directional conducting light emitting diode set (L100);

the inductive impedance component (I200) of the second impedance (Z102) is replaced by the power supply side winding of the transformer and is parallel connected with the capacitor (C200) to appear parallel resonance, thereby to constitute the second impedance while the secondary side of the separating type transformer (IT200) provides AC power of voltage rise or voltage drop to drive the bi-directional conducting light emitting diode set (L100).

* * * * *